(12) United States Patent
Fukushima et al.

(10) Patent No.: US 10,378,795 B2
(45) Date of Patent: Aug. 13, 2019

(54) EJECTOR AND EJECTOR REFRIGERATION CYCLE

(71) Applicant: DENSO CORPORATION, Kariya, Aichi-pref. (JP)

(72) Inventors: Ryu Fukushima, Kariya (JP); Yoshiyuki Yokoyama, Kariya (JP); Haruyuki Nishijima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 284 days.

(21) Appl. No.: 15/328,537

(22) PCT Filed: Jul. 14, 2015

(86) PCT No.: PCT/JP2015/003553
§ 371 (c)(1),
(2) Date: Jan. 24, 2017

(87) PCT Pub. No.: WO2016/027407
PCT Pub. Date: Feb. 25, 2016

(65) Prior Publication Data
US 2017/0211850 A1 Jul. 27, 2017

(30) Foreign Application Priority Data

Aug. 21, 2014 (JP) .................................. 2014-168277

(51) Int. Cl.
*F25B 41/04* (2006.01)
*F25B 1/06* (2006.01)
(Continued)

(52) U.S. Cl.
CPC ................ *F25B 1/06* (2013.01); *F25B 41/00* (2013.01); *F25B 41/043* (2013.01);
(Continued)

(58) Field of Classification Search
CPC ............ F25B 2341/00; F25B 2341/001; F25B 2341/0011; F25B 2341/0012;
(Continued)

(56) References Cited

U.S. PATENT DOCUMENTS 6,834,514 B2 * 12/2004 Takeuchi ............. B60H 1/3204
62/170
2004/0003608 A1 1/2004 Takeuchi et al.
(Continued)

FOREIGN PATENT DOCUMENTS

JP H05149652 A 6/1993
JP 2004037057 A 2/2004
(Continued)

*Primary Examiner* — Jonathan Bradford
(74) *Attorney, Agent, or Firm* — Harness, Dickey & Pierce, P.L.C.

(57) ABSTRACT

An ejector refrigeration cycle includes a bypass passage that guides a refrigerant on an outlet side of an evaporator drawn from a refrigerant suction port of an ejector to a suction port side of a compressor while bypassing a diffuser passage of the ejector. A differential pressure regulating valve is disposed as a bypass flow-rate adjustment device that adjusts a bypass flow rate of the refrigerant circulating though the bypass passage. An enlarged portion for gradually enlarging the passage area is formed at a most downstream part of the refrigerant flow in the bypass passage. During a low-load operation, the differential pressure regulating valve increases the bypass flow rate, thereby allowing the refrigerant to flow into the evaporator connected to the upstream side of a refrigerant suction port using the suction effect of the compressor.

8 Claims, 9 Drawing Sheets

(51) Int. Cl.
*F25B 43/00* (2006.01)
*F25B 41/00* (2006.01)
*F25B 41/06* (2006.01)
*F25B 40/02* (2006.01)
*F25B 49/02* (2006.01)

(52) U.S. Cl.
CPC ............ *F25B 41/062* (2013.01); *F25B 43/00* (2013.01); *F25B 40/02* (2013.01); *F25B 49/02* (2013.01); *F25B 2341/0011* (2013.01); *F25B 2400/0407* (2013.01); *F25B 2400/23* (2013.01); *F25B 2500/18* (2013.01); *F25B 2600/0253* (2013.01); *F25B 2700/195* (2013.01); *F25B 2700/197* (2013.01); *F25B 2700/2104* (2013.01); *F25B 2700/2106* (2013.01); *F25B 2700/21163* (2013.01); *F25B 2700/21175* (2013.01); *Y02B 30/741* (2013.01)

(58) Field of Classification Search
CPC ...... F25B 2341/0013; F25B 2341/0014; F25B 2341/0015; F25B 2341/0016; F25B 2400/0407
See application file for complete search history.

(56) References Cited

U.S. PATENT DOCUMENTS

| 2004/0255602 | A1 | 12/2004 | Sato et al. |
| 2014/0083121 | A1* | 3/2014 | Chiappetta, Jr. ........ F25B 41/00 62/115 |
| 2015/0033790 | A1 | 2/2015 | Yamada et al. |
| 2015/0211772 | A1 | 7/2015 | Shimazu |
| 2016/0186782 | A1 | 6/2016 | Nakashima et al. |
| 2016/0200170 | A1 | 7/2016 | Kawamoto et al. |

FOREIGN PATENT DOCUMENTS

| JP | 2005009775 A | 1/2005 |
| JP | 2009270785 A | 11/2009 |
| JP | 2010210111 A | 9/2010 |
| JP | 2013139890 A | 7/2013 |
| JP | 2014085097 A | 5/2014 |
| KR | 20010108735 A | 12/2001 |

* cited by examiner

NORMAL OPERATION

LOW-LOAD OPERATION

FROM INFLOW SPACE 39
43c TO GAS-PHASE REFRIGERANT OUTFLOW PASSAGE

NORMAL OPERATION

LOW-LOAD OPERATION

EJECTOR AND EJECTOR REFRIGERATION CYCLE

CROSS REFERENCE TO RELATED APPLICATIONS

This application is a U.S. National Phase Application under 35 U.S.C. 371 of International Application No. PCT/JP2015/003553 filed on Jul. 14, 2015 and published in Japanese as WO 2016/027407 A1 on Feb. 25, 2016. This application is based on and claims the benefit of priority from Japanese Patent Application No. 2014-168277 filed on Aug. 21, 2014. The entire disclosures of all of the above applications are incorporated herein by reference.

FIELD OF THE INVENTION

The present disclosure relates to an ejector that functions as a fluid decompression device, and an ejector refrigeration cycle including the ejector.

BACKGROUND ART

Conventionally, for example, Patent Document 1 discloses an ejector refrigeration cycle, which is a vapor compression refrigeration cycle device that includes an ejector as a refrigerant decompression device.

In the ejector refrigeration cycle disclosed in Patent Document 1, a refrigerant on the downstream side of an evaporator is drawn into a refrigerant suction port of an ejector by the suction effect of a high-speed injection refrigerant injected from a nozzle of the ejector. A mixed refrigerant of the injection refrigerant and the suction refrigerant is pressurized by a diffuser (pressurizing portion) of the ejector. Further, the refrigerant pressurized by the diffuser is drawn into a compressor, whereby the suction refrigerant pressure in the compressor is made higher than the refrigerant evaporation pressure in the evaporator.

Therefore, the ejector refrigeration cycle disclosed in Patent Document 1 can reduce the power consumption in the compressor, thereby improving a coefficient of performance of the cycle (COP), compared with a normal refrigeration cycle device in which the refrigerant evaporation pressure in an evaporator is substantially equal to the suction refrigerant pressure in a compressor.

RELATED ART DOCUMENT

Patent Document

Patent Document 1: Japanese Unexamined Patent Application Publication No. H 05-149652

SUMMARY OF THE INVENTION

Suppose that in the ejector refrigeration cycle of Patent Document 1, the flow rate of the refrigerant (driving flow) flowing into the nozzle of the ejector is decreased during a low-load operation for reducing a thermal load on the cycle and the like. In this case, a decrease in suction capacity for drawing the refrigerant on the evaporator downstream side from the refrigerant suction port would become larger than the decrease in the flow rate of the driving flow.

For this reason, in the ejector refrigeration cycle described in Patent Document 1, the suction capacity of the ejector is significantly decreased during the low-load operation, and thereby a sufficient amount of refrigerant may be difficult to flow into the evaporator in some cases. Thus, during the low-load operation, the fluid to be cooled might not be able to be cooled sufficiently by the evaporator.

The present disclosure has been made in view of the foregoing points, and it is a first object of the present disclosure to provide an ejector refrigeration cycle capable of sufficiently cooling the fluid to be cooled by the evaporator regardless of variations in load on the cycle.

Furthermore, it is a second object of the present disclosure to provide an ejector that can easily configure a refrigeration cycle device capable of sufficiently cooling the fluid to be cooled regardless of variations in load on the cycle.

An ejector refrigeration cycle according to a first aspect of the present disclosure includes: a compressor that compresses and discharges a refrigerant; a radiator that dissipates heat from the refrigerant discharged from the compressor; an ejector that draws a refrigerant from a refrigerant suction port by a suction effect of an injection refrigerant injected at a high speed from a nozzle portion decompressing the refrigerant flowing out of the radiator, and has a pressurizing portion pressurizing a mixed refrigerant of the injection refrigerant and suction refrigerant drawn from the refrigerant suction port; a decompression device that decompresses the refrigerant on the downstream side of the radiator; an evaporator that evaporates the low-pressure refrigerant decompressed by the decompression device, and causes the evaporated refrigerant to flow out toward the refrigerant suction port; a bypass passage that guides the refrigerant flowing out of the evaporator to a suction port side of the compressor while bypassing the ejector; and a bypass flow-rate adjustment device that adjusts a bypass flow rate of the refrigerant circulating through the bypass passage. Furthermore, the bypass passage is provided with an enlarged portion that has a passage sectional area gradually enlarged toward a refrigerant flow direction in the bypass passage.

In the ejector refrigeration cycle, the bypass passage may be provided with an enlarged portion that has a passage sectional area gradually enlarged toward a refrigerant flow direction.

With this arrangement, in the low-load operation in which a thermal load on the cycle is reduced, the bypass flow-rate adjustment device allows the refrigerant to circulate through the bypass passage, so that the compressor can draw the refrigerant flowing out of the evaporator, via the bypass passage.

Thus, during the low-load operation, the adequate amount of the refrigerant can flow into the evaporator by using the suction effect of the compressor, even though a suction capacity of the ejector is reduced. Consequently, the fluid to be cooled can be sufficiently cooled by the evaporator.

Furthermore, the bypass flow-rate adjustment device increases the bypass flow rate of the refrigerant to reduce the flow rate of the suction refrigerant drawn from the refrigerant suction port, thus making it possible to suppress the reduction in the pressurizing amount at a pressurizing portion. In addition, the enlarged portion can convert a velocity energy of the refrigerant into a pressure energy, thereby increasing the pressure of the refrigerant.

The refrigerant flowing out of the pressurizing portion of the ejector is merged with the refrigerant flowing out of the bypass passage, and the merged refrigerant is drawn into the compressor. Thus, the reduction in the coefficient of performance of the cycle can also be suppressed in the low-load operation.

Accordingly, the ejector refrigeration cycle can be provided that sufficiently cools the fluid to be cooled by the evaporator, regardless of variations in load on the cycle.

According to an ejector to be used in a vapor compression refrigeration cycle device includes:

a body that includes a decompression space adapted to decompress a refrigerant flowing in from an outside of the body, a suction passage communicating with a downstream side of a refrigerant flow of the decompression space and adapted to circulate a refrigerant drawn from the outside of the body, and a pressurizing space that mixes the injection refrigerant injected from the decompression space with the suction refrigerant drawn from the suction passage; and a passage formation member, at least a part of which is disposed within the decompression space and the pressurizing space, the passage formation member being formed in a conical shape having a sectional area enlarged as being farther away from the decompression space.

A refrigerant passage defined between an inner peripheral surface of a part forming the decompression space and an outer peripheral surface of the passage formation member in the body is a nozzle passage serving as a nozzle that decompresses and injects the refrigerant flowing out of the swirl space. Furthermore, a refrigerant passage defined between an inner peripheral surface of a part forming the pressurizing space and an outer peripheral surface of the passage formation member in the body is a diffuser passage serving as a pressurizing portion that mixes the injection refrigerant with the suction refrigerant and pressurizes the mixed refrigerant.

The body includes a bypass passage that guides the refrigerant on a side of the suction passage to a downstream side of the diffuser passage while bypassing the diffuser passage, and the bypass passage includes an enlarged portion that has a passage sectional area gradually enlarged toward a refrigerant flow direction in the bypass passage. Furthermore, the bypass passage includes a bypass flow-rate adjustment device that adjusts a bypass flow rate of the refrigerant circulating through the bypass passage.

Thus, the suction port side of the compressor is connected to the downstream side of the diffuser passage, and the refrigerant outlet side of the evaporator is connected to the upstream side of the suction passage, and thereby it can easily form the refrigeration cycle device with the cycle configuration.

In the refrigeration cycle device, during the low-load operation, the bypass flow-rate adjustment device allows the refrigerant to circulate through the bypass passage, so that the compressor can draw the refrigerant flowing out of the evaporator via the bypass passage. Thus, during the low-load operation, the adequate amount of the refrigerant can flow into the evaporator by using the suction effect of the compressor. Consequently, the fluid to be cooled can be sufficiently cooled by the evaporator.

Furthermore, the bypass flow-rate adjustment device increases the bypass flow rate to reduce the flow rate of the refrigerant flowing into the diffuser passage via the suction passage, thereby making it possible to suppress the reduction in the pressurizing amount through the diffuser passage. In addition, the enlarged portion can convert a velocity energy of the refrigerant into a pressure energy, thereby increasing the pressure of the refrigerant.

Thus, the refrigerant flowing out of the diffuser passage is merged with the refrigerant flowing out of the bypass passage, and the merged refrigerant is drawn into the compressor, so that the reduction in the coefficient of performance of the cycle can also be suppressed in the low-load operation. Accordingly, the refrigeration cycle device can be easily configured to sufficiently cool the fluid to be cooled, regardless of variations in load on the cycle.

DESCRIPTION OF EMBODIMENTS

First Embodiment

Figure 1:
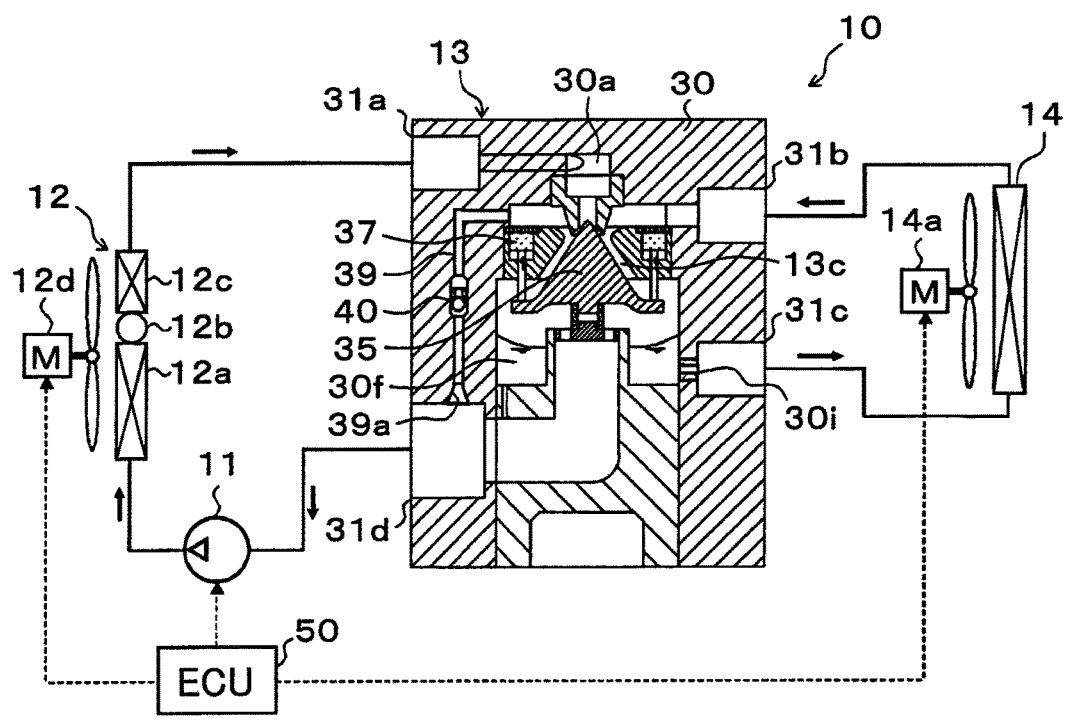
FIG. 1 is an entire configuration diagram of an ejector refrigeration cycle in a first embodiment.

A first embodiment of the present disclosure will be described below with reference to FIGS. 1 to 7. As shown in the entire configuration diagram of FIG. 1, an ejector refrigeration cycle 10 in this embodiment is applied to a vehicle air conditioner and serves to cool ventilation air to be blown into a vehicle interior as a space to be air-conditioned. Thus, a fluid to be cooled by the ejector refrigeration cycle 10 is ventilation air.

The ejector refrigeration cycle 10 in this embodiment forms a subcritical refrigeration cycle in which a high-pressure side refrigerant pressure does not exceed the critical pressure of the refrigerant, using a hydrofluorocarbon (HFC)-based refrigerant (e.g., R134a) as the refrigerant. Obviously, a hydrofluoroolefin (HFO)-based refrigerant (e.g., R1234yf) or the like may also be adopted as the refrigerant. Further, refrigerating machine oil for lubricating a compressor 11 is mixed into the refrigerant, and part of the refrigerating machine oil circulates through the cycle together with the refrigerant.

In the ejector refrigeration cycle 10, the compressor 11 draws and pressurizes the refrigerant into a high-pressure refrigerant and then discharges the pressurized refrigerant. Specifically, the compressor 11 in this embodiment is an electric compressor that accommodates a fixed displacement compression mechanism and an electric motor for driving the compression mechanism in one housing.

Examples of the compression mechanism suitable for use can include various types of compression mechanisms, such as a scroll compression mechanism, and a vane compression mechanism. The electric motor has its operation (the number of revolutions) controlled by a control signal output from a controller 50 to be described later. The electric motor may employ either an AC motor or a DC motor.

A discharge port of the compressor 11 is connected to a refrigerant inlet side of a condensing portion 12a of a radiator 12. The radiator 12 is a heat-dissipation heat exchanger that cools a high-pressure refrigerant by exchanging heat between the high-pressure refrigerant discharged from the compressor 11 and a vehicle exterior air (outside air) blown by a cooling fan 12d to thereby dissipate heat from the high-pressure refrigerant.

More specifically, the radiator 12 is configured as a so-called subcool condenser that includes the condensing portion 12a, a receiver 12b, and a subcooling portion 12c. The condensing portion 12a exchanges heat between the high-pressure gas-phase refrigerant discharged from the compressor 11 and the outside air blown by the cooling fan 12d to dissipate heat from the high-pressure gas-phase refrigerant, thereby condensing the refrigerant. The receiver 12b separates the refrigerant flowing out of the condensing portion 12a into gas and liquid phase refrigerants to store therein an excessive liquid-phase refrigerant. The subcooling portion 12c subcools the liquid-phase refrigerant by exchanging heat between the liquid-phase refrigerant flowing out of the receiver 12b and the outside air blown by the cooling fan 12d.

The cooling fan 12d is an electric blower that has the number of revolutions (blown air volume) controlled by a control voltage output from the controller 50. A refrigerant outlet side of the subcooling portion 12c in the radiator 12 is connected to a refrigerant inflow port 31a of an ejector 13.

The ejector 13 functions as a refrigerant decompression device that decompresses the high-pressure liquid-phase refrigerant in the subcooled state flowing out of the radiator 12, allowing the decompressed refrigerant to flow toward the downstream side. At the same time, the ejector 13 functions as a refrigerant circulation portion (refrigerant transport portion) that draws (transports) the refrigerant flowing out of an evaporator 14, to be described later, by a suction effect of the refrigerant flow injected at a high velocity, thereby circulating the refrigerant. Furthermore, the ejector 13 in this embodiment also functions as a gas-liquid separator that separates the decompressed refrigerant into gas and liquid phase refrigerants.

Now, the specific structure of the ejector 13 will be described with reference to FIGS. 2 to 5. Note that the up and down arrows in FIG. 2 indicate the respective up and down directions with the ejector refrigeration cycle 10 mounted on the vehicle air conditioner. FIG. 3 is a schematic cross-sectional view for explaining the function of each refrigerant passage in the ejector 13. In FIG. 3, parts with the same functions as those shown in FIG. 2 are designated by the same reference characters.

Figure 2:
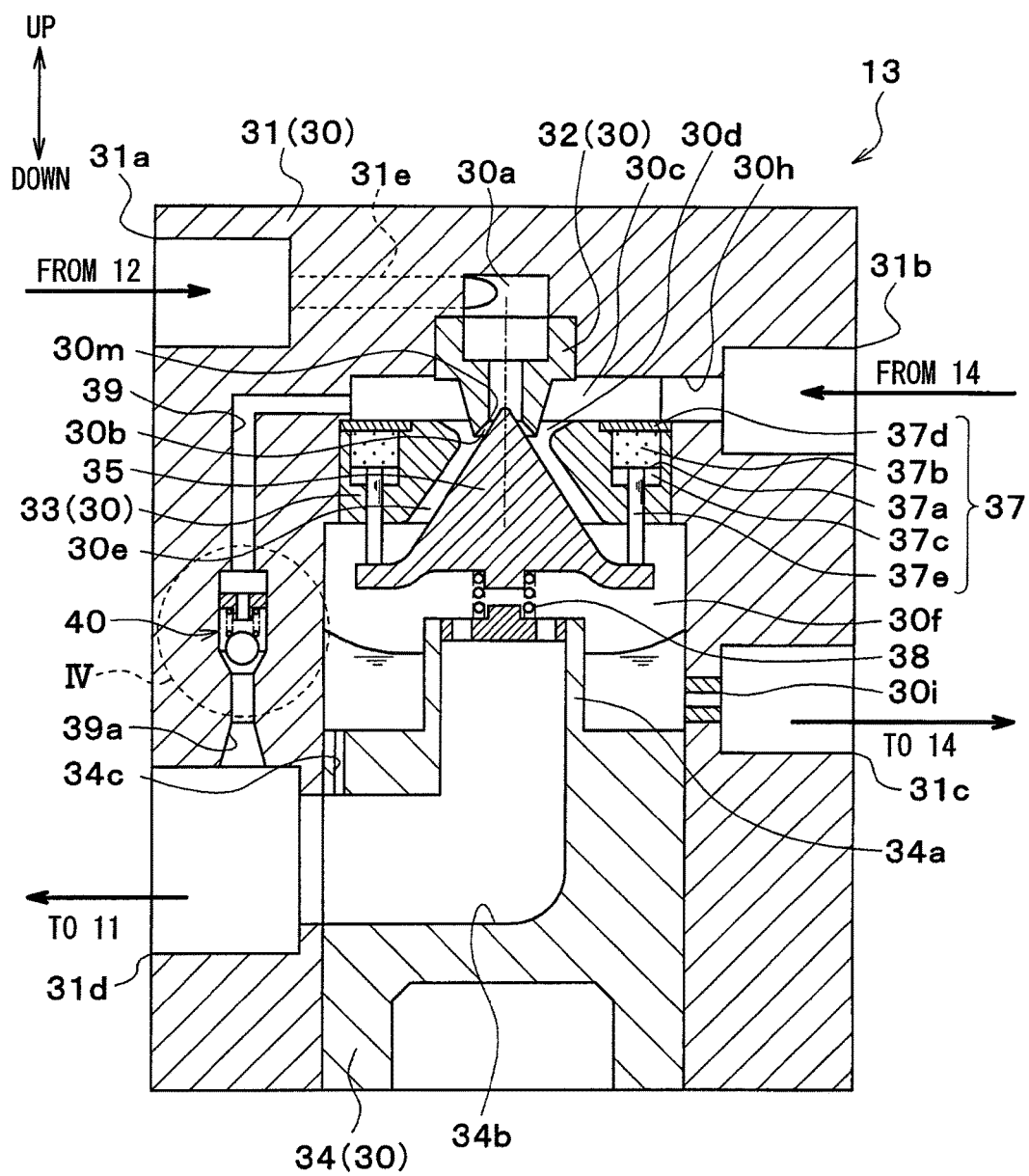
FIG. 2 is a cross-sectional view in the axial direction of an ejector in the first embodiment.
Figure 3:
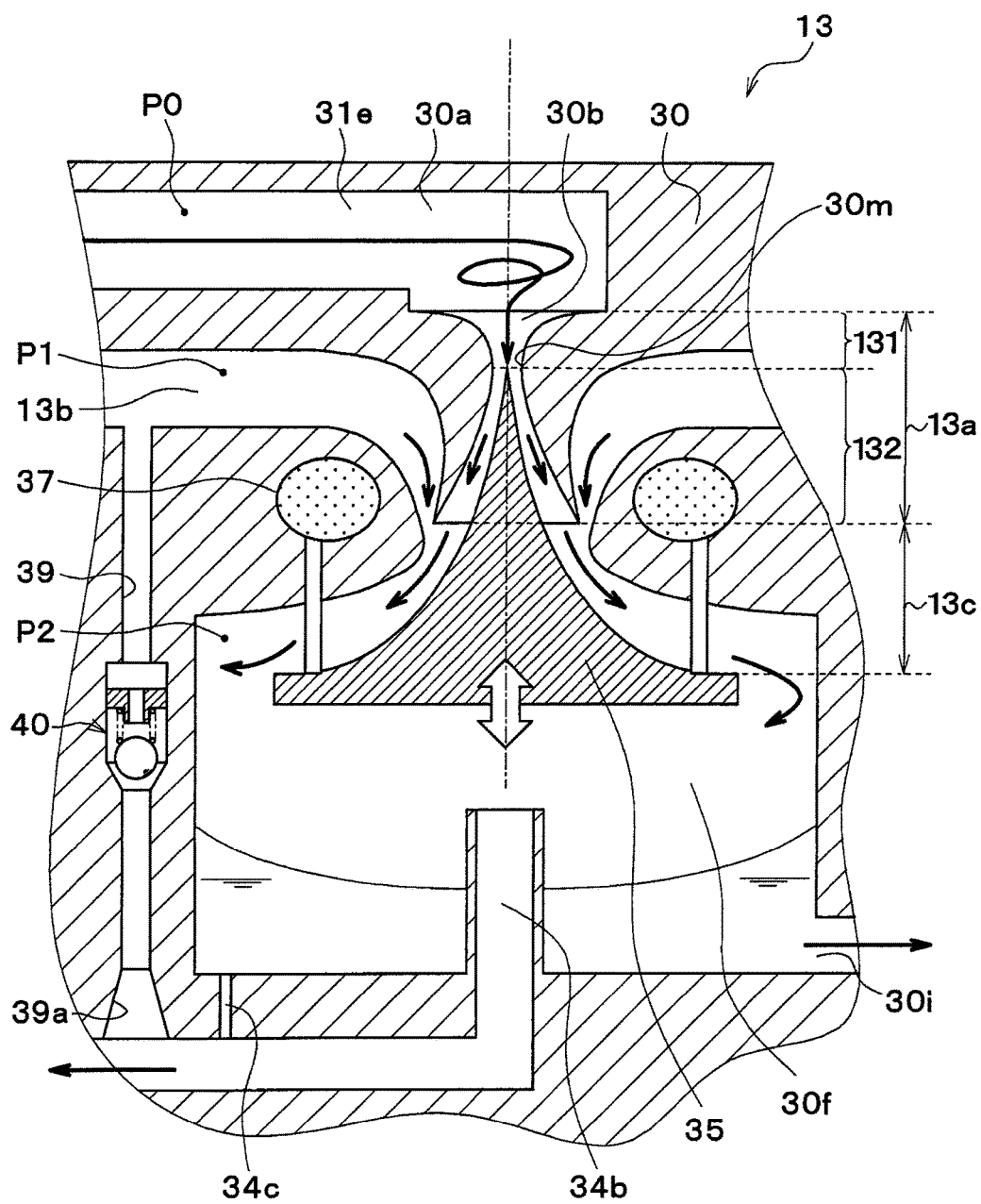
FIG. 3 is a schematic cross-sectional view for explaining the function of each refrigerant passage in the ejector of the first embodiment.

As shown in FIG. 2, the ejector 13 in this embodiment includes a body 30 formed by a combination of a plurality of components. Specifically, the body 30 has a prismatic or cylindrical housing body 31 made of metal or resin and forming an outer shell of the ejector 13. Furthermore, within the housing body 31, a nozzle body 32, a middle body 33, and a lower body 34 are fixed.

The housing body 31 is provided with the refrigerant inflow port 31a, a refrigerant suction port 31b, a liquid-phase refrigerant outflow port 31c, and a gas-phase refrigerant outflow port 31d. The refrigerant inflow port 31a allows the refrigerant exiting the radiator 12 to flow thereinto. The refrigerant suction port 31b draws the refrigerant flowing out of the evaporator 14. The liquid-phase refrigerant outflow port 31c allows the liquid-phase refrigerant, which is obtained by the separation in a gas-liquid separation space 30f formed in the body 30, to flow out to the refrigerant inlet side of the evaporator 14. The gas-phase refrigerant outflow port 31d allows the gas-phase refrigerant obtained by the separation in the gas-liquid separation space 30f to flow out to the suction port side of the compressor 11.

Furthermore, in this embodiment, an orifice 30i is disposed in a liquid-phase refrigerant passage that connects the gas-liquid separation space 30f with the liquid-phase refrigerant outflow port 31c. The orifice 30i serves as a decompression device that decompresses the refrigerant flowing into the evaporator 14.

The nozzle body 32 is formed of a substantially conical, metal member that is tapered in the refrigerant flow direction. The nozzle body 32 is fixed to the inside of the housing body 31 by any means, including press fitting, such that the axial direction of the nozzle body is oriented in the vertical direction (in the up-down direction shown in FIG. 2). A swirl space 30a for swirling the refrigerant flowing thereinto from the refrigerant inflow port 31a is formed between the upper side of the nozzle body 32 and the housing body 31.

The swirl space 30a is formed in a rotator shape while its center axis indicated by an alternate long and short dash line in FIG. 2 extends in the vertical direction. Note that the rotator shape is a tridimensional shape formed by rotating a plane figure about one straight line (central axis) located on the same plane. More specifically, the swirl space 30a in this embodiment is formed in the substantially cylindrical shape. Obviously, the swirl space may be formed in the conical shape, the shape of a combination of a truncated cone and a cylinder, or the like.

A refrigerant inflow passage 31e that connects the refrigerant inflow port 31a to the swirl space 30a extends in the tangential direction of an inner wall surface of the swirl space 30a as viewed from the central axis direction of the swirl space 30a. Thus, the refrigerant flowing from the refrigerant inflow passage 31e into the swirl space 30a flows along an inner wall surface of the swirl space 30a and then swirls around the central axis of the swirl space 30a.

Here, a centrifugal force acts on the refrigerant swirling within the swirl space 30a, whereby the refrigerant pressure on the central axis side of the swirl space 30a becomes lower than the refrigerant pressure on the perimeter side thereof. Thus, in this embodiment, during the normal operation of the ejector refrigeration cycle 10, the refrigerant pressure on the central axis side in the swirl space 30a is reduced to a pressure at which the refrigerant becomes a saturated liquid-phase refrigerant, or a pressure at which the refrigerant is decompressed and boiled (causing cavitation).

The adjustment of the refrigerant pressure on the central axis side in the swirl space 30a in this way can be achieved by adjusting the swirling-flow velocity of the refrigerant swirling in the swirl space 30a. Furthermore, the adjustment of the swirling-flow velocity can be performed, for example, by adjusting the area ratio of a passage cross-sectional area of the refrigerant inflow passage 31e to a cross-sectional area in the axial direction of the swirl space 30a. Note that the swirling-flow velocity in this embodiment means a flow velocity in the swirling direction of the refrigerant located in the vicinity of the outermost peripheral part of the swirl space 30a.

Within the nozzle body 32, a decompression space 30b is formed to decompress the refrigerant flowing out of the swirl space 30a and to allow the decompressed refrigerant to flow out toward the downstream side. The decompression space 30b is formed in a rotator shape that is obtained by a combination of a cylindrical space and a truncated-cone-shaped space which is continued from the lower side of the cylindrical space and gradually expands toward the refrigerant flow direction. The center axis of the decompression space 30b is arranged coaxially with respect to the center axis of the swirl space 30a.

Furthermore, a minimum passage area portion 30m and a passage formation member 35 are disposed within the decompression space 30b. The minimum passage area portion 30m is formed to have the minimum refrigerant passage area in the decompression space 30b. The passage formation member 35 is formed to change a passage area of the minimum passage area portion 30m.

The passage formation member 35 is formed in a substantially conical shape that gradually expands as toward the downstream side of the refrigerant flow. The passage formation member 35 has its center axis arranged coaxially with respect to the center axis of the decompression space 30b. That is, the passage formation member 35 is formed in such a conical shape that enlarges its sectional area as being farther away from the decompression space 30b.

Thus, as illustrated in FIG. 3, a refrigerant passage is formed between the inner peripheral surface of a part forming the decompression space 30b of the nozzle body 32 and the outer peripheral surface on the upper side of the passage formation member 35; the refrigerant passage includes a convergent portion 131 and a divergent portion 132. The convergent portion 131 is formed on the upstream side of the refrigerant flow relative to the minimum passage area portion 30m. The convergent portion 131 is a refrigerant passage having its refrigerant passage area gradually reduced up to the minimum passage area portion 30m. The divergent portion 132 is formed on the downstream side of the refrigerant flow relative to the minimum passage area portion 30m. The divergent portion 132 has its refrigerant passage area gradually enlarged.

In the divergent portion 132, the decompression space 30b and the passage formation member 35 are superimposed (or overlap) each other as viewed from the radial direction, so that the shape of the section of the refrigerant passage taken along a direction vertical to the axial direction is formed in an annular shape (in a donut shape obtained by removing a small-diameter circular shape from a circular shape arranged coaxially therewith). Furthermore, the refrigerant passage area in the divergent portion 132 is gradually enlarged toward the downstream side of the refrigerant flow.

In this embodiment, by the formation of the passage in this way, the refrigerant passage formed between the inner peripheral surface of the decompression space 30b and the outer peripheral surface on the tip side of the passage formation member 35 becomes a nozzle passage 13a that functions as a de Laval nozzle. The nozzle passage 13a decompresses the refrigerant and simultaneously increases the flow velocity of the refrigerant to a supersonic speed to inject the refrigerant therefrom.

As illustrated in FIG. 2, the middle body 33 is provided with a through hole that passes through the center of the middle body from the front to back side (from the upper to lower side) thereof. Furthermore, the middle body 33 is formed of a metal disk-shaped member that accommodates a driving device 37 for displacing the passage formation member 35 in an outer periphery of the through hole. Note that the center axis of the through hole in the middle body 33 is arranged coaxially with respect to the center axes of the swirl space 30a and decompression space 30b. The middle body 33 is positioned within the housing body 31 and fixed to the lower side of the nozzle body 32 by any means, including press fitting.

Furthermore, an inflow space 30c for retaining the refrigerant flowing thereinto from the refrigerant suction port 31b is formed between an upper surface of the middle body 33 and an inner wall surface of the housing body 31 opposing thereto. Since in this embodiment, the tapered tip end on the lower side of the nozzle body 32 is positioned in the through hole of the middle body 33, the inflow space 30c is formed to have an annular cross section as viewed from the direction of the center axes of the swirl space 30a and the decompression space 30b.

A suction-refrigerant inflow passage 30h that connects the refrigerant suction port 31b to the inflow space 30c desirably extends in the tangential direction of an inner peripheral wall surface of the inflow space 30c as viewed from the central axis direction of the inflow space 30c. The reason for this is that the refrigerant flowing from the refrigerant suction port 31b into the inflow space 30c via the suction-refrigerant inflow passage 30h is allowed to swirl, which can promote the swirling flow of the refrigerant that flows out of the diffuser passage 13c to be described later.

In the through hole of the middle body 33, a refrigerant passage area is gradually decreased toward the refrigerant flow direction in such a manner as to conform to the outer peripheral shape of the tapered tip end of the nozzle body 32 in a range where the lower side of the nozzle body 32 is inserted, that is, in a range where the middle body 33 is superimposed on the nozzle body 32 as viewed from the radius direction perpendicular to the axial line.

Thus, a suction passage 30d is formed between the inner peripheral surface of the through hole and the outer peripheral surface of the lower side of the nozzle body 32. The suction passage 30d serves to communicate the inflow space 30c with the downstream side of the refrigerant flow in the decompression space 30b. That is, in this embodiment, the inflow space 30c and the suction passage 30d forms a suction passage 13b that allows the suction refrigerant to flow from the outer peripheral side of the center axis toward the inner peripheral side. The suction passage 13b has its section vertical to the center axis formed in an annular shape.

A pressurizing space 30e is formed on the downstream side of the refrigerant flow of the suction passage 30d in the through hole of the middle body 33. The pressurizing space 30e is formed in the substantially truncate cone shape that gradually expands toward the refrigerant flow direction. The pressurizing space 30e is a space that mixes an injection refrigerant injected from the above-mentioned nozzle passage 13a with the suction refrigerant drawn from the suction passage 30d. The center axis of the pressurizing space 30e is arranged coaxially with respect to the center axes of the swirl space 30a and decompression space 30b.

Within the pressurizing space 30e, the lower side of the passage formation member 35 is disposed. Furthermore, a refrigerant passage is formed between an inner peripheral surface of a part forming the pressurizing space 30e of the middle body 33 and an outer peripheral surface of the lower side of the passage formation member 35; the refrigerant passage is formed to gradually enlarge its refrigerant passage area toward the downstream side of the refrigerant flow. Thus, the refrigerant passage can convert the velocity energy of a mixed refrigerant of the injection refrigerant and the suction refrigerant to a pressure energy thereof.

Thus, as illustrated in FIG. 3, a refrigerant passage formed between the inner peripheral surface of the middle body 33 forming the pressurizing space 30e and the outer peripheral surface on the lower side of the passage formation member 35 configures a diffuser passage 13c that serves as a diffuser (pressurizing portion) for mixing and pressurizing the injection refrigerant and the suction refrigerant. The sectional shape of the diffuser passage 13c in the direction vertical to the center axis is also an annular shape.

Next, a description will be given of the driving device 37 that is disposed in the middle body 33 and adapted to displace the passage formation member 35. The driving device 37 is configured to have a circular thin-plate-shaped diaphragm 37a serving as a pressure responding member. More specifically, as illustrated in FIG. 2, the diaphragm 37a is fixed by any means, such as welding, to partition the cylindrical space formed on the outer peripheral side of the middle body 33 into two, namely, upper and lower spaces.

The upper one (on the inflow space 30c side) of the two spaces partitioned by the diaphragm 37a configures a sealing space 37b that seals thereinto a thermo-sensitive medium which changes its pressure depending on the temperature of the refrigerant on the outlet side of the evaporator 14 (specifically, the refrigerant flowing out of the evaporator 14). Into the sealing space 37b, the thermo-sensitive medium having substantially the same composition as that of the refrigerant circulating through the ejector refrigeration cycle 10 is sealed so as to have a predetermined density. Thus, the thermo-sensitive medium in this embodiment is a medium having R134a as a principal component.

On the other hand, the lower one of the two spaces partitioned by the diaphragm 37a configures an introduction space 37c that introduces thereinto the refrigerant on the outlet side of the evaporator 14 via a communication path (not shown). Thus, heat of the refrigerant on the outlet side of the evaporator 14 is transferred to the thermo-sensitive medium sealed in the sealing space 37b via the diaphragm 37a and a lid member 37d for separating the inflow space 30c from the sealing space 37b.

Furthermore, the diaphragm 37a is displaced depending on a pressure difference between the internal pressure of the sealing space 37b and the pressure of the refrigerant on the outlet side of the evaporator 14 flowing into the introduction space 37c. For this reason, the diaphragm 37a is preferably formed of material with adequate elasticity, and excellent thermal conductivity and toughness. The diaphragm 37a is desirably formed of a metal thin plate made of, e.g., stainless (SUS304) or the like.

The upper end of a cylindrical actuating bar 37e is bonded to the center portion of the diaphragm 37a by any means, such as welding, while the lower end of the actuating bar 37e is fixed to the outer periphery of the lowermost part (bottom part) of the passage formation member 35. Thus, the diaphragm 37a and the passage formation member 35 are coupled together, and the passage formation member 35 is displaced together with the displacement of the diaphragm 37a, so that the refrigerant passage area at the minimum passage area portion 30m of the nozzle passage 13a is adjusted.

More specifically, once the temperature (degree of superheat) of the refrigerant on the outlet side of the evaporator 14 is raised, a saturated pressure of the thermo-sensitive medium sealed into the sealing space 37b is increased, resulting in an increase in pressure difference that is obtained by subtracting the pressure of the introduction space 37c from the internal pressure of the sealing space 37b. Thus, the diaphragm 37a displaces the passage formation member 35 in the direction that enlarges the refrigerant passage area at the minimum passage area portion 30m (downward in the vertical direction).

On the other hand, once the temperature (degree of superheat) of the refrigerant on the outlet side of the evaporator 14 is lowered, a saturated pressure of the thermo-sensitive medium sealed into the sealing space 37b is reduced, resulting in a decrease in pressure difference that is obtained by subtracting the pressure of the introduction space 37c from the internal pressure of the sealing space 37b. Thus, the diaphragm 37a displaces the passage formation member 35 in the direction that reduces the refrigerant passage area at the minimum passage area portion 30m (upward in the vertical direction).

In this way, the diaphragm 37a displaces the passage formation member 35 depending on the degree of superheat of the refrigerant on the outlet side of the evaporator 14. Thus, the refrigerant passage area of the minimum passage area portion 30m is adjusted such that the degree of superheat of the refrigerant on the outlet side of the evaporator 14 approaches a predetermined reference degree of superheat KSH. Note that a gap between the actuating bar 37e and the middle body 33 is sealed with a sealing member, such as an O-ring (not shown). When the actuating bar 37e is displaced, the refrigerant does not leak from the gap.

The bottom surface of the passage formation member 35 receives a load of a coil spring 38 fixed to the lower body 34. The coil spring 38 applies the load to the passage formation member 35 so as to urge the passage formation member 35 to decrease the refrigerant passage area at the minimum passage area portion 30m. The adjustment of such a load can change a target reference degree of superheat KSH by changing a valve opening pressure of the passage formation member 35.

In this embodiment, a plurality of (specifically, two) cylindrical spaces is provided in the perimeter of the middle body 33, and the circular thin-plate-shaped diaphragms 37a are fixed inside the respective spaces to thereby form the two driving devices 37. However, the number of the driving devices 37 is not limited thereto. Note that when provided at a plurality of sites, the driving devices 37 are desirably arranged at an equal angle interval with respect to the respective center axes thereof.

Then, the lower body 34 is formed of a cylindrical metal member, and fixed to the inside of the housing body 31 by means, such as screwing, to close the bottom surface of the housing body 31. Between the upper side of the lower body 34 and the middle body 33, the gas-liquid separation space 30f is formed to separate the refrigerant flowing out of the diffuser passage 13c formed in the pressurizing space 30e into gas and liquid phases.

The gas-liquid separation space 30f is formed as a space having a substantially cylindrical, rotator shape. The center axis of the gas-liquid separation space 30f is arranged coaxially with respect to the center axes of the swirl space 30a, the decompression space 30b, the pressurizing space 30e, and the like. Furthermore, the refrigerant flowing out of the diffuser passage 13c into the gas-liquid separation space 30f has a velocity component in a swirling direction around the center axis. Thus, within the gas-liquid separation space 30f, the refrigerant is separated into the gas and liquid phase refrigerants by the centrifugal force.

Furthermore, the internal volume of the gas-liquid separation space 30f is set to a volume that cannot substantially retain an excessive refrigerant, even though the flow rate of the refrigerant circulating through the cycle changes due to variations in the load on the cycle.

The lower body 34 has on its center part, a cylindrical pipe 34a arranged coaxially with respect to the gas-liquid separation space 30f and extending upward. The liquid-phase refrigerant, which is obtained by the separation in the gas-liquid separation space 30f, is temporarily retained on the outer peripheral side of the pipe 34a, and then flows out of the liquid-phase refrigerant outflow port 31c. Within the pipe 34a, a gas-phase refrigerant outflow passage 34b is formed to guide the gas-phase refrigerant obtained by the separation in the gas-liquid separation space 30f to the gas-phase refrigerant outflow port 31d of the housing body 31.

The above-mentioned coil spring 38 is fixed to the upper end of the pipe 34a. Note that the coil spring 38 also serves as a vibration buffer member that attenuates the vibration of the passage formation member 35 due to pressure pulsation caused in decompressing the refrigerant. An oil return hole 34c is formed at the bottom surface of the lower body 34. The oil return hole 34c serves to return refrigerant oil in the liquid-phase refrigerant to the inside of the compressor 11 via the gas-phase refrigerant outflow passage 34c.

The housing body 31 in this embodiment is provided with a bypass passage 39 that guides the refrigerant flowing into the inflow space 30c, to the gas-phase refrigerant outflow passage 34b side while bypassing the suction passage 30d, the diffuser passage 13c, and the gas-liquid separation space 30f. An enlarged portion 39a is formed at the most downstream side of the refrigerant flow of the bypass passage 39 so as to gradually enlarge its passage sectional area toward the refrigerant flow direction.

Figure 4:
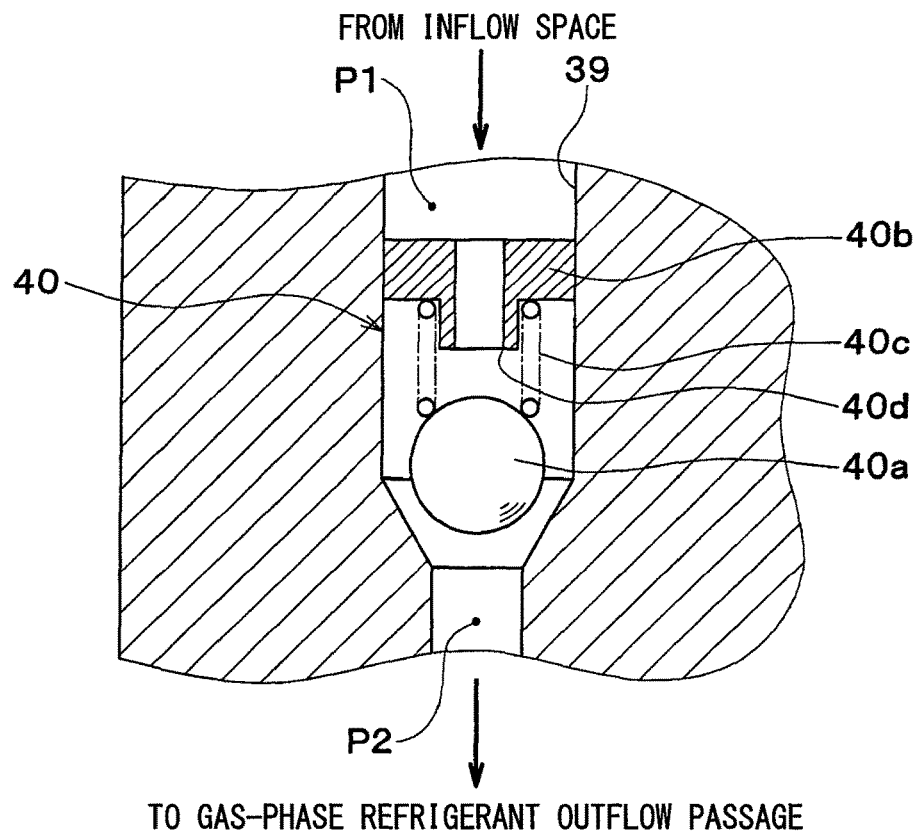
FIG. 4 is a schematic enlarged cross-sectional view of a part IV shown in FIG. 2.

In the bypass passage 39, a differential pressure regulating valve 40 is disposed as a bypass flow-rate adjustment device that adjusts the flow rate (bypass flow rate) Gb of the refrigerant circulating though the bypass passage 39. The detailed structure of the differential pressure regulating valve 40 will be described with reference FIG. 4. FIG. 4 illustrates the state in which the differential pressure regulating valve 40 opens the bypass passage 39, so that the refrigerant on the outlet side of the evaporator 14 and drawn into the suction passage 13b of the ejector 13 can circulate through the bypass passage 39.

As shown in FIG. 4, the differential pressure regulating valve 40 includes a ball valve 40a, a sheet 40b, and a coil spring 40c.

The ball valve 40a is a valve body formed spherically. The ball valve 40a is displaced depending on a pressure difference (P2−P1) that is obtained by subtracting a pressure P1 of the refrigerant on the inlet side of the bypass passage 39 from a pressure P2 of the refrigerant on the outlet side of the bypass passage 39.

Here, the pressure P2 is a pressure of the refrigerant drawn into the compressor 11 via a gas-phase refrigerant outflow passage 34b. The pressure P1 is a pressure of the refrigerant flowing out of the evaporator 14 and then into the inflow space 30c. Thus, the pressure difference (P2−P1) corresponds to a pressurizing amount of the refrigerant in the diffuser passage 13c.

The sheet 40b is a disk-shaped member with a through hole 40d formed at its center and completely passing through the sheet. The through hole 40d configures the refrigerant passage for the bypass passage 39. The outer periphery of the sheet 40b is fixed to the inside of the bypass passage 39 by any means, such as press-fitting. When the pressure difference (P2−P1) is equal to or more than a predetermined reference pressure difference ΔKP, the ball valve 40a is abutted against the sheet 40b to close the through hole in the sheet 40b.

Figure 5:
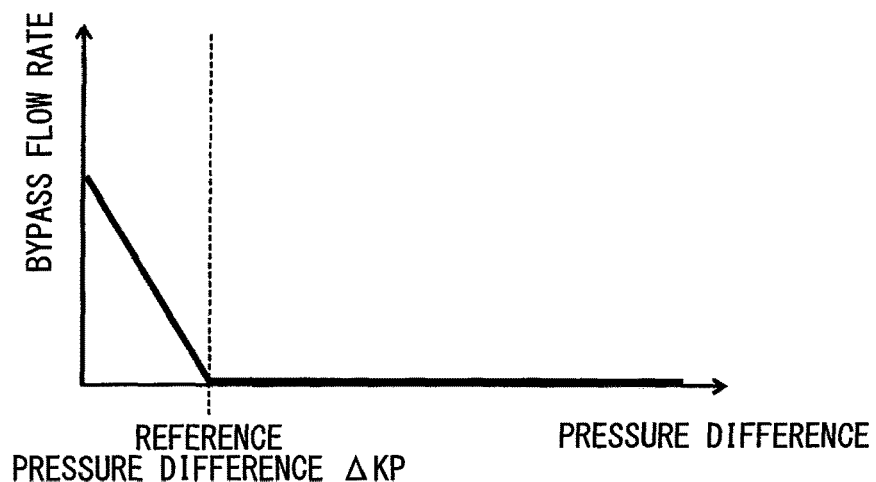
FIG. 5 is a graph showing changes in the bypass flow rate with respect to changes in the pressure difference at a differential pressure regulating valve in the first embodiment.

In this way, the bypass passage 39 is closed. That is, as shown in FIG. 5, the differential pressure regulating valve 40 in this embodiment can increase the bypass flow rate (i.e., the refrigerant passage area of the differential pressure regulating valve 40) with decreasing pressure difference (P2−P1) when the pressure difference (P2−P1) is lower than the reference pressure difference ΔKP.

The coil spring 40c is fixed to the sheet 40b and applies a load onto the ball valve 40a that urges the ball valve 40a to be farther away from the sheet 40b. Thus, the load applied by the coil spring 40c is adjusted to change the valve opening pressure of the ball valve 40a, thereby making it possible to change the reference pressure difference ΔKP.

In this embodiment, the reference pressure difference ΔKP is set smaller than the pressurizing amount of the refrigerant in the diffuser passage 13c during the normal operation of the ejector refrigeration cycle 10. Here, the pressurizing amount of the refrigerant in the diffuser passage 13c becomes substantially equal to the pressure difference (P2−P1) that is obtained by subtracting the pressure P1 of the refrigerant on the inlet side of the bypass passage 39 from the pressure P2 of the refrigerant on the outlet side of the bypass passage 39. Thus, in the normal operation, the differential pressure regulating valve 40 closes the bypass passage 39.

For clarity, FIGS. 2 and 4 illustrate that an internal flow path of the differential pressure regulating valve 40 as the bypass flow-rate adjustment device is directly placed in the housing body 31. However, in practice, the bypass flow-rate adjustment device may not be disposed within the housing body 31 if the internal flow path has a complicated structure.

In such a case, for example, a bypass flow-rate adjustment device that is formed separately from the housing body 31 may be inserted into an insertion hole formed in the housing body 31 and thereby displaced within the housing body 31. The housing body 31 may be configured by a plurality of divided members, and the bypass flow-rate adjustment device may be disposed within the housing body 31.

An inlet of the bypass passage 39 in this embodiment is opened at the outermost periphery of the inflow space 30c. Thus, the heat (temperature) of the refrigerant on the upstream side of the bypass passage 39 among the refrigerant flowing into the inflow space 30c is transferred to the thermo-sensitive medium sealed in the sealing space 37b of the above-mentioned driving device 37.

That is, the driving device 37 in this embodiment displaces the passage formation member 35 such that the degree of superheat of the refrigerant on the outlet side of the evaporator 14 approaches the reference degree of superheat KSH in accordance with the temperature and pressure of the refrigerant circulating through the suction passage 13b and positioned on the upstream side of the bypass passage 39.

In other words, the driving device 37 in this embodiment displaces the passage formation member 35 such that the degree of superheat of the refrigerant flowing into the suction passage 13b approaches the reference degree of superheat KSH in accordance with the temperature and pressure of the refrigerant circulating through the refrigerant flow path that leads from the refrigerant suction port 31*b* (i.e., inlet of the suction passage 13*b*) to the inlet side of the bypass passage 39.

As illustrated in FIG. 1, the liquid-phase refrigerant outflow port 31*c* of the ejector 13 is connected to the refrigerant inlet side of the evaporator 14. The evaporator 14 is a heat-absorption heat exchanger that exchanges heat between the low-pressure refrigerant decompressed by the ejector 13 and the ventilation air to be blown to the vehicle interior from a blower fan 14*a*, thereby evaporating the low-pressure refrigerant to exhibit the heat absorption effect.

The blower fan 14*a* is an electric blower that has the number of revolutions (blown air volume) controlled by a control voltage output from the controller 50. An outlet side of the evaporator 14 is connected to the refrigerant suction port 31*b* of the ejector 13. The gas-phase refrigerant outflow port 31*d* of the ejector 13 is connected to the suction side of the compressor 11.

The controller 50 (not shown) is configured of a known microcomputer, including the CPU, ROM, and RAM, and a peripheral circuit thereof. The controller 50 performs various computations and processing based on control programs stored in the ROM to control the operations of various electric actuators 11, 12*d*, and 14*a* described above and the like.

A group of sensors for air conditioning is connected to the controller 50 and designed to input detection signals therefrom to the controller. The group of sensors includes an inside-air temperature sensor, an outside-air temperature sensor, a solar radiation sensor, an evaporator temperature sensor, an outlet-side temperature sensor, and an outlet-side pressure sensor. The inside-air temperature sensor detects a vehicle interior temperature. The outside-air temperature sensor detects an outside air temperature. The solar radiation sensor detects the solar radiation amount applied to the vehicle interior. The evaporator temperature sensor detects the blown-air temperature (evaporator temperature) from the evaporator 14. The outlet-side temperature sensor detects the temperature of the refrigerant on the outlet side of the radiator 12. The outlet-side pressure sensor detects the pressure of the refrigerant on the outlet side of the radiator 12.

The input side of the controller 50 is connected to an operation panel (not shown) disposed near the dashboard at the front of a vehicle compartment. Operation signals from various operation switches provided on the operation panel are input to the controller 50. Specifically, various operation switches provided on the operation panel include an air-conditioning operation switch for requesting the air-conditioning of the vehicle interior, and a vehicle-interior temperature setting switch for setting the temperature of the vehicle interior.

The controller 50 in this embodiment incorporates therein control units for controlling the operations of various control target devices connected to its output side. In the controller 50, a structure (hardware and software) adapted to control the operation of each control target device serves as a control means for the corresponding control target device. For instance, in this embodiment, the structure for controlling the operation of an electric motor for the compressor 11 configures a discharge-capacity control means.

Next, the operation of this embodiment with the above-mentioned structure will be described. In the beginning, the normal operation will be described with reference to a Mollier diagram shown in FIG. 6. The Mollier diagram in each of FIGS. 6 and 7 indicates pressures corresponding to P0, P1, and P2 shown in FIG. 3 on its vertical axis.

First, when the operation switch on the operation panel is turned on (in the ON state), the controller 50 actuates the electric motor of the compressor 11, the cooling fan 12*d*, the blower fan 14*a*, and the like. In this way, the compressor 11 draws, compresses, and discharges the refrigerant.

The high-temperature and high-pressure refrigerant discharged from the compressor 11 (at point a6 in FIG. 6) flows into the condensing portion 12*a* of the radiator 12 and exchanges heat with the outside air blown from the cooling fan 12*d*, thereby dissipating heat therefrom to be condensed. The refrigerant condensed by the condensing portion 12*a* is separated into gas and liquid phase refrigerants by the receiver 12*b*. The liquid-phase refrigerant of the gas and liquid phase refrigerants separated by the receiver 12*b* exchanges heat with the outside air blown from the cooling fan 12*d* in the subcooling portion 12*c*, and further dissipates heat therefrom to be converted into a subcooled liquid-phase refrigerant (as indicated from point a6 to point b6 in FIG. 6).

Figure 6:
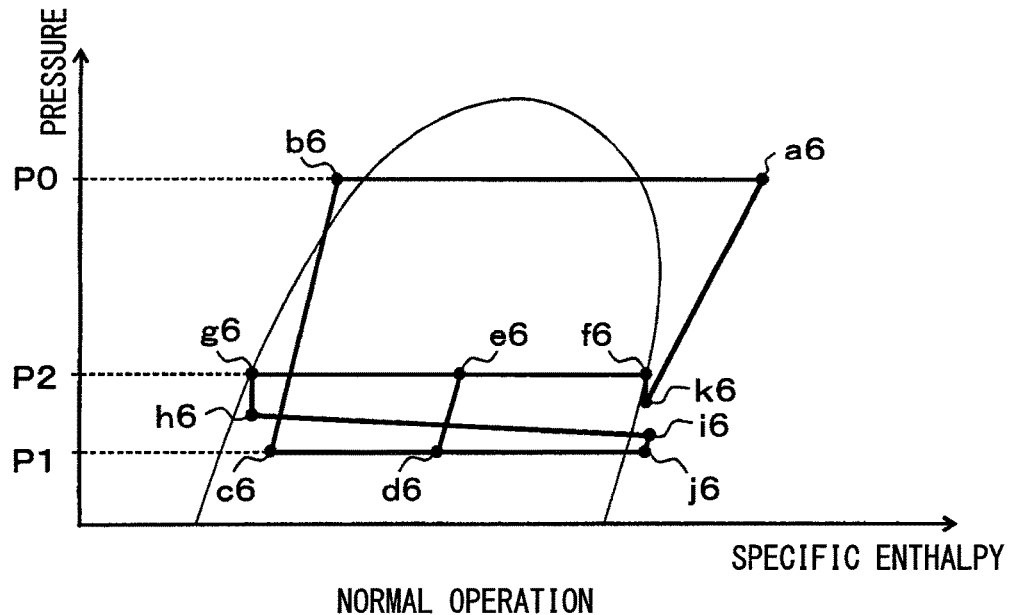
FIG. 6 is a Mollier diagram showing the states of the refrigerant during a normal operation of the ejector refrigeration cycle in the first embodiment.

The subcooled liquid-phase refrigerant flowing out of the subcooling portion 12*c* of the radiator 12 flows into the swirl space 30*a* of the ejector 13 and further is isentropically decompressed and injected by the nozzle passage 13*a* formed between the inner peripheral surface of the decompression space 30*b* and the outer peripheral surface of the passage formation member 35 (as indicated from point b6 to point c6 in FIG. 6). At this time, the refrigerant passage area of the minimum passage area portion 30*m* in the decompression space 30*b* is adjusted such that the degree of superheat of the refrigerant on the outlet side of the evaporator 14 approaches the reference degree of superheat KSH.

The refrigerant flowing out of the evaporator 14 (at point i6 in FIG. 6) is drawn from the refrigerant suction port 31*b* into the ejector 13 by the suction effect of the injection refrigerant injected from the nozzle passage 13*a*. The injection refrigerant injected from the nozzle passage 13*a* and the suction refrigerant drawn via the suction passage 13*b* flow into and are merged in the diffuser passage 13*c* (as indicated from point c6 to point d6 and from point j6 to point d6 in FIG. 6).

At this time, during the normal operation, the differential pressure regulating valve 40 closes the bypass passage 39, whereby the whole flow of the suction refrigerant drawn from the refrigerant suction port 31*b* into the suction passage 13*b* flows into the diffuser passage 13*c* to be merged with the injection refrigerant.

Here, the suction passage 30*d* is formed to have its refrigerant passage area decreased gradually. Thus, the suction refrigerant passing through the suction passage 30*d* increases its flow velocity while reducing its pressure (as indicated from point i6 to point j6 in FIG. 6). Thus, a difference in velocity between the suction refrigerant and injection refrigerant is reduced, which can reduce the energy loss (mixing loss) that would otherwise be caused when mixing the suction refrigerant and the injection refrigerant in the diffuser passage 13*c*.

In the diffuser passage 13*c*, the kinetic energy of the refrigerant is converted into the pressure energy thereof by enlarging the refrigerant passage area. Thus, while the injection refrigerant and suction refrigerant are being mixed together, the mixed refrigerant has its pressure increased (as indicated from point d6 to point e6 in FIG. 6).

The refrigerant flowing out of the diffuser passage 13*c* is separated by the gas-liquid separation space 30*f* into gas and liquid phase refrigerants (as indicated from point e6 to point f6 and from point e6 to point g6 in FIG. 6). The liquid-phase refrigerant obtained by the separation in the gas-liquid separation space 30f is decompressed by the orifice 30i (as indicated from point g6 to point h6 in FIG. 6) and then flows into the evaporator 14.

The refrigerant flowing into the evaporator 14 absorbs heat from the ventilation air blown by the blower fan 14a to evaporate itself (as indicated from point h6 to point i6 in FIG. 6). In this way, the ventilation air is cooled. On the other hand, the gas-phase refrigerant obtained by the separation in the gas-liquid separation space 30f flows out of the gas-phase refrigerant outflow port 31d, and is drawn into and compressed again by the compressor 11 (as indicated from point k6 to point a6 in FIG. 6).

The reason why the point f6 differs from the point k6 in FIG. 6 is that the refrigerant drawn into the compressor 11 causes a suction pressure loss at the compressor 11. Thus, in an ideal cycle, the point f6 desirably coincides with the point k6. The same goes for other Mollier diagrams.

As mentioned above, in the normal operation, the ventilation air to be blown into the vehicle interior can be cooled. Furthermore, the ejector refrigeration cycle 10 draws the refrigerant pressurized by the diffuser passage 13c into the compressor 11, and thus can reduce the driving power for the compressor 11, thereby improving the coefficient of performance (COP) of the cycle.

The ejector 13 in this embodiment swirls the liquid-phase refrigerant in the swirl space 30a, whereby the refrigerant pressure on the swirl center side of the swirl space 30a is reduced to a pressure at which the refrigerant becomes a saturated liquid-phase refrigerant, or a pressure at which the refrigerant is decompressed and boiled (causing cavitation). In this way, the gas-phase refrigerant is present more on the inner side than on the outer side within the swirl space 30a in the circumferential direction of the swirl center axis, which can produce a two-phase separated state of a single gas phase in the vicinity of the swirl center line of the swirl space 30a and a single liquid phase around the gas phase.

The refrigerant separated into the two phases in this way flows into the nozzle passage 13a. Thus, in the convergent portion 131 of the nozzle passage 13a, boiling of the refrigerant is promoted due to wall boiling caused when the refrigerant is removed from the outer peripheral wall surface of the annular refrigerant passage, as well as interface boiling by nucleate boiling caused by the cavitation of the refrigerant on the center axis side of the annular refrigerant passage. In this way, the refrigerant flowing into the minimum passage area portion 30m of the nozzle passage 13a is a gas-liquid mixed state in which a gas phase and a liquid phase are mixed homogeneously.

Then, the flow of the refrigerant in the gas-liquid mixed state is blocked (causing choking) in the vicinity of the minimum passage area portion 30m. This choking accelerates the refrigerant in the gas-liquid mixed state that has reached the sound speed, at the divergent portion 132, thus injecting the accelerated refrigerant. In this way, both the wall boiling and interface boiling promote the boiling of the refrigerant, so that the refrigerant in the gas-liquid mixed state can be effectively accelerated until it reaches the sound speed, making it possible to improve energy conversion efficiency in the nozzle passage 13a.

The ejector 13 in this embodiment employs the passage formation member 35 in a conical shape that has its sectional area enlarged as being farther away from the decompression space 30b. Thus, the diffuser passage 13c can be shaped to expand along the outer periphery of the passage formation member 35 as being farther away from the decompression space 30b. Consequently, the dimension in the axial direction of the entire ejector 13 can be shortened.

In the ejector 13 of this embodiment, the gas-liquid separation space 30f is formed in the body 30, so that the volume of the gas-liquid separation space 30f can be made small, compared to when providing a gas-liquid separator with the same function separately from the ejector 13.

Specifically, when using the ejector refrigeration cycle 10 of this embodiment for cooling in early spring or late autumn at a relatively low temperature of the outside air, or for dehumidifying and heating in winter, the thermal load on the cycle becomes lower than that in the above-mentioned normal operation. During such operations (hereinafter referred to as a low-load operation), a discharge capacity control means of the controller 50 reduces the refrigerant discharge capacity of the compressor 11.

Thus, during the low-load operation, the flow rate of the circulation refrigerant circulating through the cycle is reduced, and thereby the flow rate of the refrigerant (driving flow) flowing into the nozzle passage 13a of the ejector 13 is also reduced. Together with the reduction in the flow rate of the driving flow, the suction capacity of drawing the refrigerant on the outlet of the evaporator 14 from the refrigerant suction port 31b of the ejector 13 might be reduced.

Thus, during the low-load operation, the adequate amount of the refrigerant cannot flow into the evaporator 14, which might fail to sufficiently cool the ventilation air.

To address this, in the ejector 13 of this embodiment, the bypass passage 39 is formed in the body 30 (specifically, housing body 31), and further within the bypass passage 39, the differential pressure regulating valve 40 is disposed as a bypass flow-rate adjustment device. Thus, the adequate amount of refrigerant can flow into the evaporator 14 even during the low-load operation.

This fact will be described below with reference to a Mollier diagram shown in FIG. 7. Note that as compared to the Mollier diagram of FIG. 6, respective reference characters indicative of the states of the refrigerant in the Mollier diagram of FIG. 7 use the same alphabet to show the state of the refrigerant in the equivalent position of the cycle configuration, but alter only subscripts (numbers) added to the same alphabet in use. The same goes for the following Mollier diagram.

Figure 7:
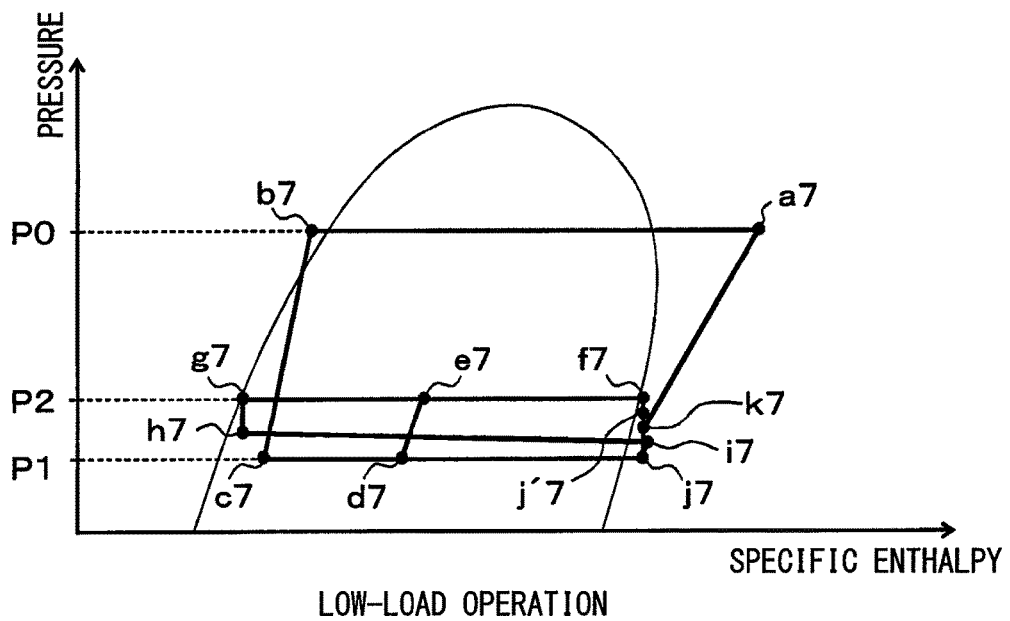
FIG. 7 is a Mollier diagram showing the states of the refrigerant during a low-load operation of the ejector refrigeration cycle in the first embodiment.

Also in the low-load operation, like in the normal operation, the high-temperature and high-pressure refrigerant (as indicated by point a7 in FIG. 7) discharged from the compressor 11 dissipates heat therefrom in the radiator 12 until the refrigerant becomes a subcooled liquid-phase refrigerant (as indicated from point a7 to point b7 in FIG. 7). During the low-load operation, as mentioned above, the controller 50 reduces the refrigerant discharge capacity of the compressor 11, whereby the pressure P0 of the refrigerant discharged from the compressor 11 becomes lower than that during the normal operation.

The subcooled liquid-phase refrigerant flowing out of the radiator 12 is isentropically decompressed in and injected from the nozzle passage 13a of the ejector 13, like in the normal operation (as indicated from point b7 to point c7 in FIG. 7). Thus, the refrigerant flowing out of the evaporator 14 (as indicated at point i7 in FIG. 7) is drawn from the refrigerant suction port 31b.

Then, the injection refrigerant injected from the nozzle passage 13a and part of the suction refrigerant drawn from the refrigerant suction port 31b flow into the diffuser passage 13c via the inflow space 30c and the suction passage 30d.

In the low-load operation, the flow rate of the driving flow is decreased, compared to the normal operation. Thus, the kinetic energy of the refrigerant, which is to be converted to the pressure energy in the diffuser passage 13c, is also reduced. Because of this, during the low-load operation, the pressurizing amount of the refrigerant in the diffuser passage 13c is reduced, whereby the pressure difference (P2−P1) becomes lower than the reference pressure difference ΔKP. Consequently, the differential pressure regulating valve 40 opens the bypass passage 39.

Thus, in the low-load operation, part of the refrigerant drawn from the refrigerant suction port 31b flows into the diffuser passage 13c side, while the remaining refrigerant flows into the bypass passage 39 side.

The refrigerant flowing into the diffuser passage 13c, which is part of the refrigerant drawn from the refrigerant suction port 31b, is mixed with the injection refrigerant in the diffuser passage 13c, like in the normal operation, and then the mixture is pressurized (as indicated from point c7 to point d7 and then point e7, and from point i7 to point j7, point d7, and then point e7 of FIG. 7). The following operation for the refrigerant pressurized in the diffuser passage 13c is performed in the same way as in the normal operation.

On the other hand, the refrigerant flowing into the bypass passage 39, which is the other part of the refrigerant drawn from the refrigerant suction port 31b, is pressurized by converting the kinetic energy of the refrigerant into the pressure energy thereof when passing through the enlarged portion 39a (as indicated from point j7 to point j'7 in FIG. 7). The refrigerant flowing from the bypass passage 39 into the gas-phase refrigerant outflow passage 34b is merged with the gas-phase refrigerant obtained by the separation in the gas-liquid separation space 30f, and drawn into and compressed again by the compressor 11 (as indicated from point k7 to point a7 in FIG. 7).

As mentioned above, in the low-load operation, the differential pressure regulating valve 40 serving as the bypass flow-rate adjustment device allows the refrigerant to circulate through the bypass passage 39, so that the compressor 11 can draw the refrigerant on the outlet side of the evaporator 14 via the bypass passage 39. Thus, during the low-load operation, the adequate amount of the refrigerant can flow into the evaporator 14 by using the suction effect of the compressor 11. Consequently, the ventilation air can be sufficiently cooled by the evaporator 14.

Furthermore, the differential pressure regulating valve 40 increases a bypass flow rate Gb to reduce the flow rate of the refrigerant flowing from the inflow space 30c into the diffuser passage 13c, thus suppressing the reduction in the pressurizing amount at the diffuser passage 13c (corresponding to the difference between P2 and P1 as shown in FIG. 7). In addition, the enlarged portion 39a can convert the velocity energy of the refrigerant circulating through the bypass passage 39 into the pressure energy thereof, thereby increasing the pressure of the refrigerant.

Thus, the gas-phase refrigerant flowing out of the diffuser passage 13c and obtained by the separation in the gas-liquid separation space 30f is merged with the refrigerant flowing out of the enlarged portion 39a of the bypass passage 39 into a mixture, which is then drawn into the compressor 11, so that the reduction in the COP can also be suppressed in the low-load operation.

That is, the ejector refrigeration cycle 10 in this embodiment can sufficiently cool the ventilation air, even though the flow rate of the driving flow in the ejector 13 is reduced during the low-load operation. The ejector 13 in this embodiment can easily configure the ejector refrigeration cycle 10 that is capable of sufficiently cooling the ventilation air even in the low-load operation Furthermore, the differential pressure regulating valve 40 in this embodiment is configured to increase the bypass flow path Gb with decreasing pressure difference (P2−P1). Thus, the bypass flow rate Gb can be adjusted depending on the flow rate of the driving flow in the low-load operation, whereby the flow rate of the refrigerant flowing into the evaporator 14 can be adjusted appropriately.

The ejector 13 in this embodiment includes the driving device 37, so that the passage formation member 35 can be displaced depending on variations in the load on the ejector refrigeration cycle 10 to adjust the refrigerant passage area of the nozzle passage 13a (passage sectional area in the minimum passage area portion 30m). Thus, the ejector 13 can be appropriately operated in accordance with variations in the load on the ejector refrigeration cycle 10.

Furthermore, the driving device 37 in this embodiment displaces the passage formation member 35 such that the degree of superheat of the refrigerant flowing into the suction passage 13b approaches the reference degree of superheat KSH in accordance with the temperature and pressure of the refrigerant circulating through the suction passage 13b and positioned on the upstream side of the bypass passage 39. Therefore, the ejector 13 can be appropriately operated such that the degree of superheat of the refrigerant flowing into the suction passage 13b approaches the reference degree of superheat KSH regardless of the opening degree of the differential pressure regulating valve 40.

Additionally, in this embodiment, the driving device 37 is configured of the mechanical mechanisms, including the sealing space 37b and the diaphragm 37a, so that the ejector 13 can be appropriately operated in accordance with variations in the load on the cycle without the need for a complicated control.

Second Embodiment

Figure 8:
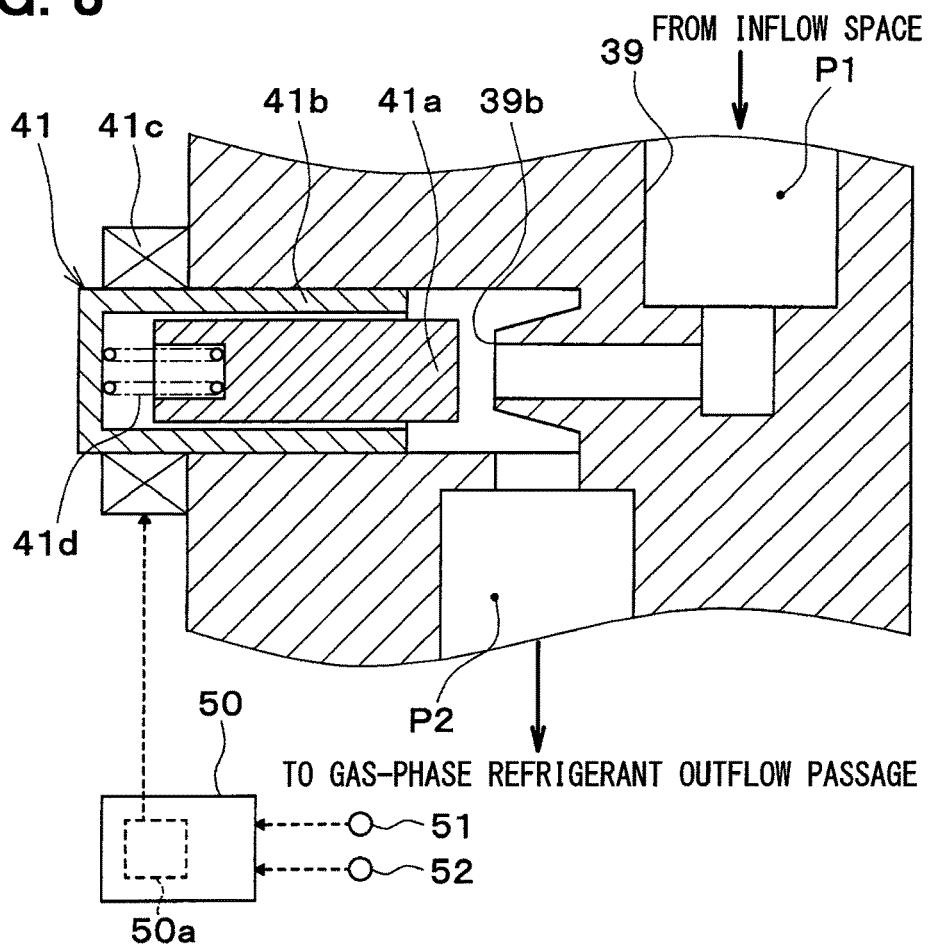
FIG. 8 is a schematic enlarged cross-sectional view of a flow-rate adjustment valve in a second embodiment.

This embodiment will describe an example in which the structure of the bypass flow-rate adjustment device is changed, compared to that in the first embodiment. Specifically, in this embodiment, an electric flow-rate adjustment valve 41 shown in FIG. 8 is employed as the bypass flow-rate adjustment device. FIG. 8 is a schematic enlarged cross-sectional view of the electric flow-rate adjustment valve 41, corresponding to FIG. 4, which has been explained in the first embodiment. Specifically, FIG. 8 illustrates a state in which the flow-rate adjustment valve 41 opens the bypass passage 39.

The flow-rate adjustment valve 41 in this embodiment includes an armature 41a, a cover 41b, a coil 41c, and a coil spring 41d.

The armature 41a is formed of a substantially cylindrical magnetic material. The armature 41a is displaced depending on an electromagnetic force generated by the coil 41c to change an opening degree of a refrigerant passage hole 39b formed in the bypass passage 39. More specifically, the armature 41a is displaced to increase the opening degree of the refrigerant passage hole 39b with increasing electromagnetic force generated by the coil 41c.

The cover 41b is formed in a bottomed cylindrical shape and accommodates therein the armature 41a. The cover 41b is formed of the substantially same magnetic material as that of the armature 41a to configure a magnetic circuit for the electromagnetic force generated by the coil 41c. The coil 41c is an electromagnet that generates the electromagnetic force by being supplied with power from the controller 50. The coil 41*c* is disposed on the outer peripheral side of the cover 41*b*.

The coil spring 41*d* is fixed at the inside bottom of the cover 41*b*. The coil spring 41*d* applies a load onto the armature 41*a* that urges the armature 41*a* to abut the armature against an opening edge of the refrigerant passage hole 39*b* (to close the refrigerant passage hole 39*b*). Thus, the flow-rate adjustment valve 41 in this embodiment closes the bypass passage 39 when no power is supplied to the coil 41*c*.

As shown in FIG. 8, the input side of the controller 50 in this embodiment is connected to an outlet side temperature sensor 51 and an outlet side pressure sensor 52. The outlet side temperature sensor 51 serves as outlet side temperature detection means for detecting the temperature of the refrigerant on the outlet side of the evaporator 14. The outlet side pressure sensor 52 serves as outlet side pressure detection means for detecting the pressure of the refrigerant on the outlet side of the evaporator 14.

In this embodiment, a structure (hardware and software) of the controller 50 that controls the operation of the electric flow-rate adjustment valve 41 configures a bypass flow-rate control means 50*a*. The structures of other components in the ejector 13 and the ejector refrigeration cycle 10 are the same as those in the first embodiment.

Next, the operation of this embodiment with the above-mentioned structure will be described. In this embodiment, the controller 50 calculates the degree of superheat of the refrigerant on the outlet side of the evaporator 14 based on a detected temperature by the outlet side temperature sensor 51 and a detected pressure by the outlet side pressure sensor 52.

Figure 9:
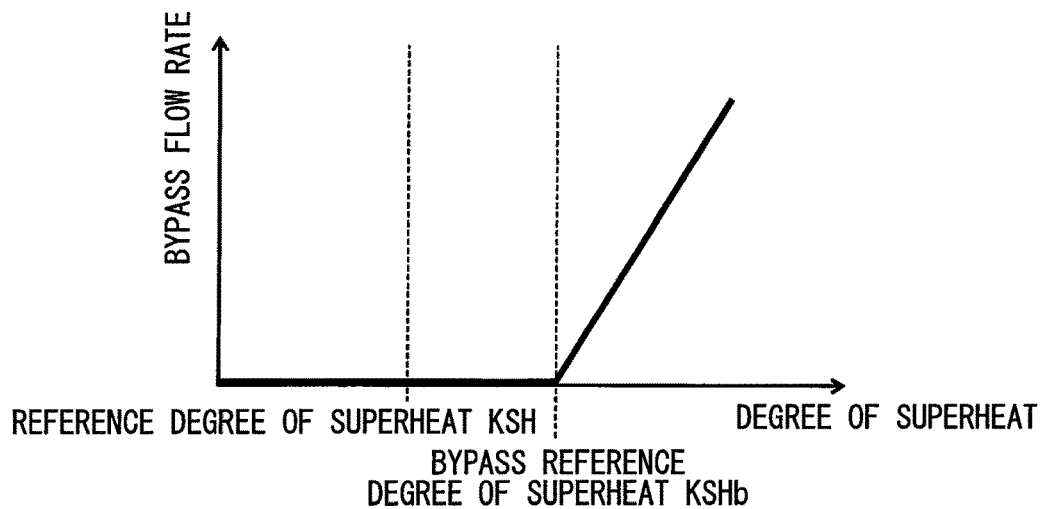
FIG. 9 is a graph showing changes in the bypass flow rate with respect to changes in the degree of superheat at the flow-rate adjustment valve in the second embodiment.

As shown in FIG. 9, when the calculated degree of superheat is equal to or more than a predetermined bypass reference degree of superheat KSHb, the bypass flow rate Gb (i.e., the refrigerant passage area of the flow-rate adjustment valve 41) is increased with increasing degree of superheat. In this embodiment, the bypass reference degree of superheat KSHb is set higher than the reference degree of superheat KSH described in the first embodiment. The operations of other components in this embodiment are the same as those in the first embodiment.

In the normal operation, the driving device 37 displaces the passage formation member 35 to make the degree of superheat of the refrigerant on the outlet side of the evaporator 14 approach the reference degree of superheat KSH. Because of this, during the normal operation, the degree of superheat of the refrigerant on the outlet side of the evaporator 14 will never be equal to or more than the bypass reference degree of superheat KSHb. In the normal operation, the flow-rate adjustment valve 41 closes the bypass passage 39. Thus, during the normal operation, the ejector refrigeration cycle operates in the same manner as in the first embodiment, and thus can obtain the same effects as those in the first embodiment.

During the low-load operation, the flow rate of the driving flow in the ejector 13 is reduced, and the flow rate of the refrigerant flowing into the evaporator 14 is also reduced, so that the degree of superheat of the refrigerant on the outlet side of the evaporator 14 tends to increase. Thus, even if the passage formation member 35 is displaced so as to maximize the passage sectional area of the minimum passage area portion 30*m* in the nozzle passage 13*a*, the degree of superheat of the refrigerant on the outlet side of the evaporator 14 exceeds the reference degree of superheat KSH to become the bypass reference degree of superheat KSHb or more.

When the degree of superheat of the refrigerant on the outlet side of the evaporator 14 is equal to or more than the bypass reference degree of superheat KSHb during the low-load operation, as shown in FIG. 9, the flow-rate adjustment valve 41 allows the refrigerant to circulate through the bypass passage 39. Thus, even during the low-load operation, the ejector refrigeration cycle operates in the same manner as in the first embodiment, and thus can suppress the reduction in the COP, while sufficiently cooling the ventilation air in the evaporator 14.

Furthermore, in this embodiment, the controller 50 controls the operation of the flow-rate adjustment valve 41 in such a manner as to increase the bypass flow rate Gb with increasing degree of superheat of the refrigerant on the outlet side of the evaporator 14. Thus, the bypass flow rate Gb can be adjusted depending on the flow rate of the driving flow in the low-load operation, so that the flow rate of the refrigerant flowing into the evaporator 14 can be adjusted appropriately.

Third Embodiment

Figure 10:
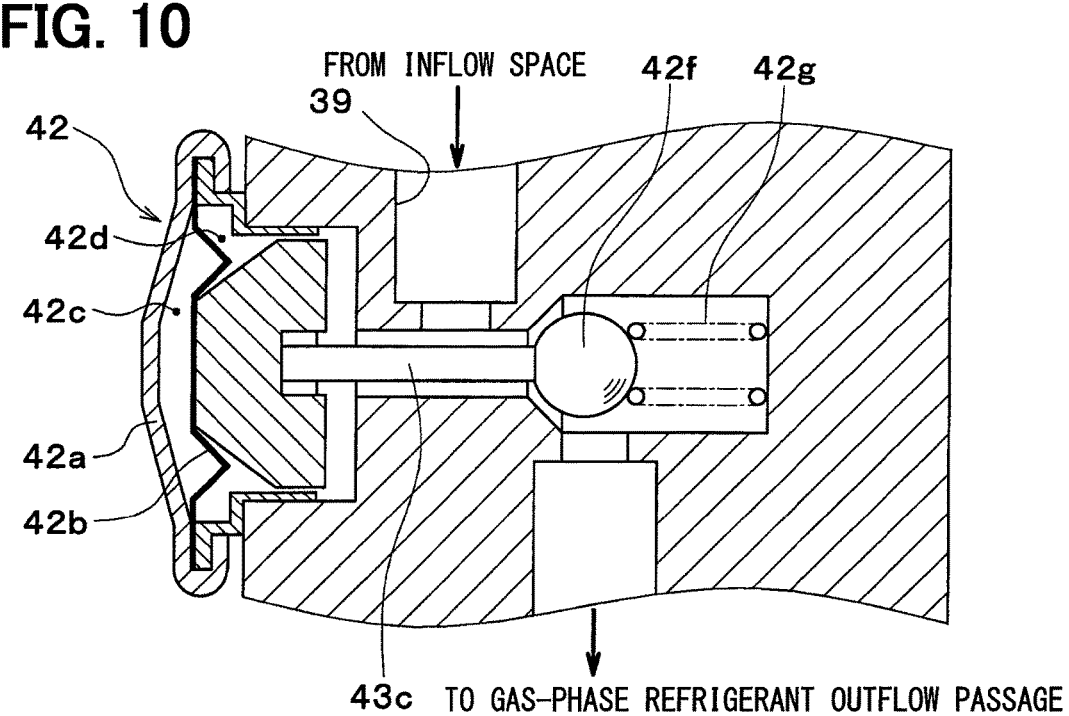
FIG. 10 is a schematic enlarged cross-sectional view of a flow-rate adjustment valve in a third embodiment.

This embodiment will describe an example in which the structure of the bypass flow-rate adjustment device is changed, compared to that in the first embodiment. Specifically, in this embodiment, the bypass flow-rate adjustment device in use is a thermo-sensitive flow-rate adjustment valve 42 shown in FIG. 10. FIG. 10 is a schematic enlarged cross-sectional view of the thermo-sensitive flow-rate adjustment valve 42, corresponding to FIG. 4, which has been described in the first embodiment. Specifically, FIG. 10 illustrates a state in which the flow-rate adjustment valve 42 opens the bypass passage 39.

The flow-rate adjustment valve 42 in this embodiment includes an element 42*a*, a diaphragm 42*b*, an actuating bar 43*c*, a ball valve 42*f*, and a coil spring 42*g*.

The element 42*a* and the diaphragm 42*b* form the similar structure as that of the driving device 37. More specifically, the element 42*a* is formed of a bowl-shaped metal member that forms a rotator-shaped space therein. The diaphragm 42*b* is formed of a circular stainless metal thin plate (made of SUS304). The diaphragm 42*b* partitions the space formed inside the element 42*a* into a sealing space 42*c* and an introduction space 42*d*.

A thermo-sensitive medium is sealed into the sealing space 42*c* in the same manner as in the sealing space 37*b* of the driving device 37. The refrigerant circulating through the bypass passage 39 (that is, the refrigerant on the outlet side of the evaporator 14) flows into the introduction space 42*d*. Accordingly, the heat of the refrigerant on the outlet side of the evaporator 14 is transferred to the thermo-sensitive medium sealed in the sealing space 42*c* via the diaphragm 42*b*.

The center of the diaphragm 42*b* is coupled to one end of the cylindrical actuating bar 42*e*, while the other end of the actuating bar 43*c* is coupled to the ball valve 42*f*. Thus, with the displacement of the diaphragm 42*b*, the ball valve 42*f* is displaced, thereby adjusting the refrigerant passage area in the bypass passage 39.

More specifically, once the degree of superheat of the refrigerant on the outlet side of the evaporator 14 is raised, a saturated pressure of the thermo-sensitive medium sealed in the sealing space 42*c* is increased, resulting in an increase in pressure difference that is obtained by subtracting the pressure of the introduction space 42*d* from the internal pressure of the sealing space 42*c*. Thus, the diaphragm 42*b* displaces the ball valve 42*f* in the direction that enlarges the refrigerant passage area in the bypass passage 39.

On the other hand, once the degree of superheat of the refrigerant on the outlet side of the evaporator 14 is lowered, a saturated pressure of the thermo-sensitive medium sealed in the sealing space 42*c* is reduced, resulting in a decrease in pressure difference that is obtained by subtracting the pressure of the introduction space 42*d* from the internal pressure of the sealing space 42*c*. Thus, the diaphragm 42*b* displaces the ball valve 42*f* in the direction that reduces the refrigerant passage area in the bypass passage 39.

That is, the thermo-sensitive flow-rate adjustment valve 42 in this embodiment can increase the bypass flow rate Gb (i.e., the refrigerant passage area of the flow-rate adjustment valve 41) with increasing degree of superheat of the refrigerant on the outlet side of the evaporator 14. The coil spring 42*g* applies a load onto the ball valve 42*f* that urges the ball valve 42*f* to reduce the refrigerant passage area in the bypass passage 39. The coil spring 42*g* can adjust the load to thereby change the valve opening pressure of the ball valve 42*f*.

In this embodiment, the load of the coil spring 42*g* is set in such a manner as to increase the bypass flow rate Gb with increasing degree of superheat when the degree of superheat of the refrigerant on the outlet side of the evaporator 14 is equal to or higher than the bypass reference degree of superheat KSHb. The thermo-sensitive flow-rate adjustment valve 42 in this embodiment is adapted to increase the bypass flow rate Gb with increasing degree of superheat, exactly like the electric flow-rate adjustment valve 41 of the second embodiment (i.e., as illustrated in FIG. 9).

The structures of other components in the ejector 13 and the ejector refrigeration cycle 10 are the same as those in the first embodiment. Thus, during either the normal operation or the low-load operation, the ejector refrigeration cycle 10 in this embodiment operates in the same manner as in the second embodiment, and thus can obtain the same effects as those in the second embodiment.

Furthermore, this embodiment configures the flow-rate adjustment valve 42 by using the mechanical mechanism, so that the bypass flow rate Gb can be adjusted depending on the flow rate of the driving flow in the low-load operation without the need for a complicated control, thereby appropriately adjusting the flow rate of the refrigerant flowing into the evaporator 14.

Fourth Embodiment

Figure 11:
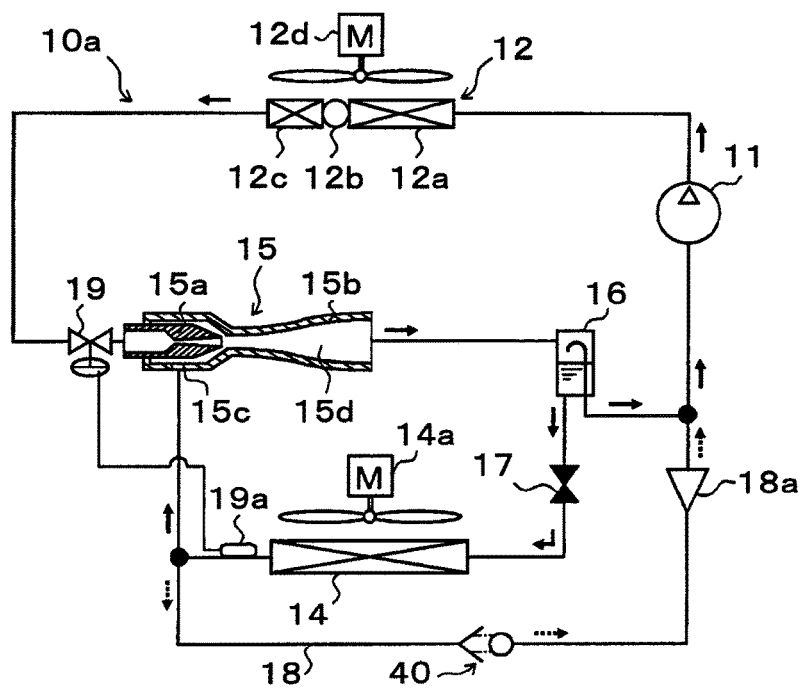
FIG. 11 is an entire configuration diagram of an ejector refrigeration cycle in a fourth embodiment.

As illustrated in the entire configuration diagram of FIG. 11, this embodiment will describe an ejector refrigeration cycle 10*a* that includes an ejector 15 without having a bypass passage in a body.

More specifically, the ejector 15 in this embodiment includes a nozzle portion 15*a* and a body portion 15*b*. The nozzle portion 15*a* is formed of metal (e.g., a stainless alloy) and the like having a substantially cylindrical shape that is gradually tapered toward the flow direction of the refrigerant. The nozzle portion 15*a* isentropically decompresses and expands the refrigerant in a refrigerant passage (throttle passage) formed therein.

This embodiment employs the nozzle portion 15*a* in which the flow velocity of the injection refrigerant injected from a refrigerant injection port is set to be equal to or higher than the sound speed during the normal operation of the ejector refrigeration cycle 10. Such a nozzle portion 15*a* in use may be either the de Laval nozzle or a convergent nozzle.

The body portion 15*b* is formed of metal (e.g., aluminum) or resin in a substantially cylindrical shape. The body portion 15*b* serves as a fixing member that supports and fixes the nozzle portion 15*a* therein while forming an outer shell of the ejector 15. More specifically, the nozzle portion 15*a* is press-fitted into and fixed to the inside of one end in the longitudinal direction of the body portion 15*b*. Thus, no refrigerant leaks from a fixed portion (press-fitting portion) between the nozzle portion 15*a* and the body portion 15*b*.

Part of the outer peripheral surface of the body portion 15*b* that corresponds to the outer periphery of the nozzle portion 15*a* is provided with a refrigerant suction port 15*c* completely passing through the part and communicating with the refrigerant injection port of the nozzle portion 15*a*. The refrigerant suction port 15*c* is a through hole for drawing the refrigerant flowing out of the evaporator 14 into the ejector 15, as will be described later, by the suction effect of the injection refrigerant injected from the nozzle portion 15*a*.

The inside of the body portion 15*b* is provided with a suction passage and a diffuser 15*d*. The suction passage guides the suction refrigerant drawn from the refrigerant suction port 15*c* to the refrigerant injection port side of the nozzle portion 15*a*. The diffuser 15*d* serves as a pressurizing portion for mixing the injection refrigerant with the suction refrigerant flowing from the refrigerant suction port 15*c* into the ejector 15 via the suction passage to pressurize the mixture.

The diffuser 15*d* is disposed to continuously lead to an outlet of the suction passage and formed by a space that gradually enlarges its refrigerant passage area. Thus, the diffuser 15*d* has a function of mixing the injection refrigerant and the suction refrigerant to decelerate the flow velocity of the mixed refrigerant, thereby increasing the pressure of the mixed refrigerant of the injection refrigerant and the suction refrigerant, that is, a function of converting the velocity energy of the mixed refrigerant into the pressure energy thereof.

In the ejector refrigeration cycle 10*a* of this embodiment, the inlet side of a gas-liquid separator 16 is connected to the outlet side of the diffuser 15*d* in the ejector 15. The gas-liquid separator 16 is a gas-liquid separator that separates the refrigerant flowing out of the diffuser 15*d* into gas and liquid phase refrigerants. That is, the gas-liquid separator 16 corresponds to the gas-liquid separation space 30*f* of the ejector 13 described in the first embodiment.

Furthermore, this embodiment employs the gas-liquid separator 16 that has a relatively small capacity so as to allow the liquid-phase refrigerant obtained by the separation to flow out of the liquid-phase refrigerant outflow port almost without storing the liquid-phase refrigerant. It is apparent that the gas-liquid separator in use may be one that has a function of liquid storing means for storing an excessive liquid-phase refrigerant in the cycle.

The gas-phase refrigerant outflow port of the gas-liquid separator 16 is connected to the suction port side of the compressor 11. The liquid-phase refrigerant outflow port of the gas-liquid separator 16 is connected to the refrigerant inlet side of the evaporator 14 via a fixed throttle 17. The fixed throttle 17 corresponds to the orifice 30*i* of the ejector 13 described in the first embodiment.

Specific examples of the fixed throttle 17 can include an orifice and a capillary tube. The refrigerant suction port 15c side of the ejector 15 is connected to the refrigerant outlet side of the evaporator 14.

In this embodiment, a bypass passage 18 is provided to connect a refrigerant passage leading from the refrigerant outlet side of the evaporator 14 to the refrigerant suction port 15c with a refrigerant passage leading from the gas-phase refrigerant outflow port of the gas-liquid separator 16 to the suction port of the compressor 11. The bypass passage 18 is a refrigerant passage that guides the refrigerant flowing out of the evaporator 14 to the suction port side of the compressor 11 while bypassing the ejector 15.

An enlarged portion 18a that has its passage sectional area gradually enlarged toward the refrigerant flow direction is formed on the most downstream side of the refrigerant flow of the bypass passage 18. The bypass passage 18 and the enlarged portion 18a correspond to the bypass passage 39 and the enlarged portion 39a described in the first embodiment, respectively. In the bypass passage 18, the differential pressure regulating valve 40, which is substantially the same as that in the first embodiment, is disposed as a bypass flow-rate adjustment device that adjusts the flow rate (bypass flow rate) Gb of the refrigerant circulating though the bypass passage 18.

In this embodiment, a thermal expansion valve 19 is disposed on the upstream side of the nozzle portion 15a in the ejector 15 so as to adjust the flow rate of the refrigerant flowing into the nozzle portion 15a.

The thermal expansion valve 19 is disposed on the downstream side of the evaporator 14 and has a thermo-sensitive portion 19a that detects the degree of superheat of the refrigerant on the outlet side of the evaporator 14 based on the temperature and pressure of the refrigerant on the upstream side of the bypass passage 18. Such a thermal expansion valve 19 is a driving flow-rate adjustment device that changes the refrigerant passage area by a mechanical mechanism such that the degree of superheat of the refrigerant on the outlet side of the evaporator 14 approaches the reference degree of superheat KSH.

In other words, the thermal expansion valve 19 is a driving flow-rate adjustment device that adjusts the flow rate of the refrigerant (flow rate of the driving flow) flowing into the nozzle portion 15a based on the temperature and pressure of the refrigerant circulating through the refrigerant passage that leads from the refrigerant outlet side of the evaporator 14 to the inlet side of the bypass passage 18 such that the degree of superheat of the refrigerant on the outlet side of the evaporator 14 approaches the reference degree of superheat KSH.

The structures of other components in the ejector refrigeration cycle 10a are the same as those in the first embodiment. That is, the ejector refrigeration cycle 10a in this embodiment can achieve the cycle structure that is substantially the same as the ejector refrigeration cycle 10 described in the first embodiment.

Thus, when operating the ejector refrigeration cycle 10a in this embodiment, the refrigerant flows in the way indicated by the solid arrow shown in FIG. 11. The ejector refrigeration cycle 10a operates in the same manner as in the first embodiment and can obtain the same effects as those in the first embodiment. Further, during the low-load operation, the refrigerant flows as indicated by the dashed arrow, in addition to the solid arrow in FIG. 11, which can sufficiently cool the ventilation air in the evaporator 14, while suppressing the reduction in the COP, like the first embodiment.

Fifth Embodiment

Figure 12:
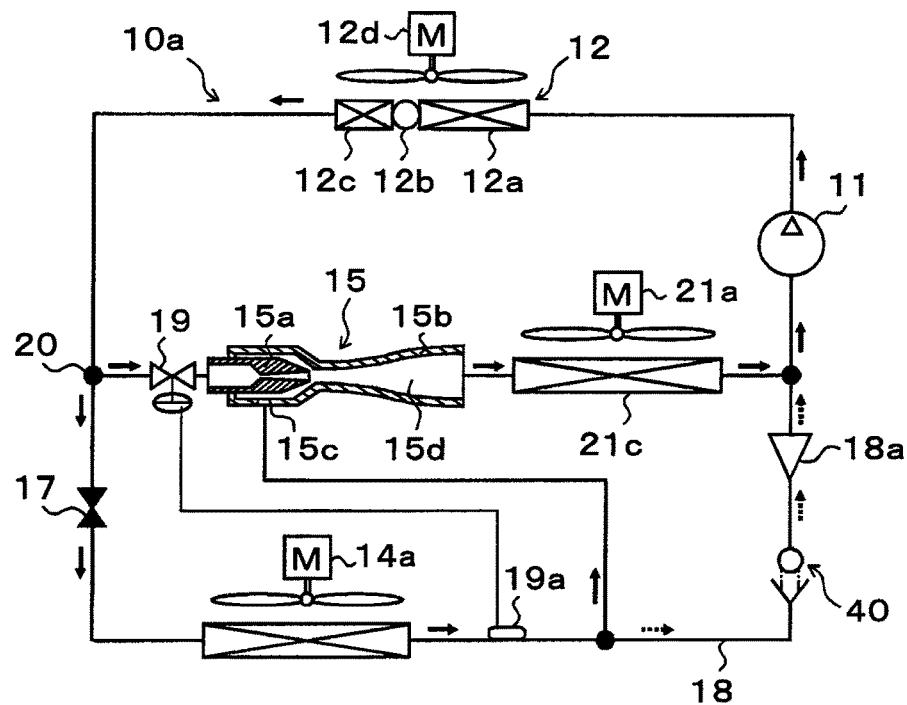
FIG. 12 is an entire configuration diagram of an ejector refrigeration cycle in a fifth embodiment.

As illustrated in the entire configuration diagram of FIG. 12, this embodiment will describe an ejector refrigeration cycle 10b in which the cycle configuration is changed from that of the fourth embodiment.

More specifically, in the ejector refrigeration cycle 10b of this embodiment, the refrigerant inflow port side of a branch portion 20 is connected to an outlet side of the radiator 12. The branch portion 20 has a three-way joint structure that branches the flow of a subcooled liquid-phase refrigerant flowing out of the radiator 12. One of the refrigerant outflow ports of the branch portion 20 is connected to the refrigerant suction port 15c side of the ejector 15 via the thermal expansion valve 19. The other refrigerant outflow port of the branch portion 20 is connected to the refrigerant inlet side of the evaporator 14 via the fixed throttle 17.

In this embodiment, a refrigerant inlet side of a second evaporator 21 is connected to an outlet side of the diffuser 15d of the ejector 15. The second evaporator 21 has substantially the same basic structure as the evaporator 14. The second evaporator 21 is a heat-absorption heat exchanger that exchanges heat between the low-pressure refrigerant flowing out of the diffuser 15d of the ejector 15 and the ventilation air to be blown to the vehicle interior from a blower fan 21a, thereby evaporating the low-pressure refrigerant to exhibit the heat absorption effect.

More specifically, the vehicle air conditioner in this embodiment is configured as a so-called dual air conditioner that is designed to cool ventilation air to be blown toward the front seat of the vehicle by means of the evaporator 14 and to cool ventilation air to be blown toward the rear seat of the vehicle by means of the second evaporator 21. Note that in the description below, the evaporator 14 will be hereinafter referred to as a first evaporator 14 for clarity of the description.

The refrigerant outlet side of the second evaporator 21 is connected to the refrigerant suction port side of the compressor 11. The structures of other components in the ejector refrigeration cycle 10b are the same as those in the fourth embodiment.

Next, the operation of this embodiment with the above-mentioned structure will be described. First, the normal operation will be described with reference to a Mollier diagram shown in FIG. 13. During the normal operation, like the above-mentioned embodiment, the differential pressure regulating valve 40 closes the bypass passage 18, allowing the refrigerant to flow as indicated by the solid arrow in FIG. 12.

Figure 13:
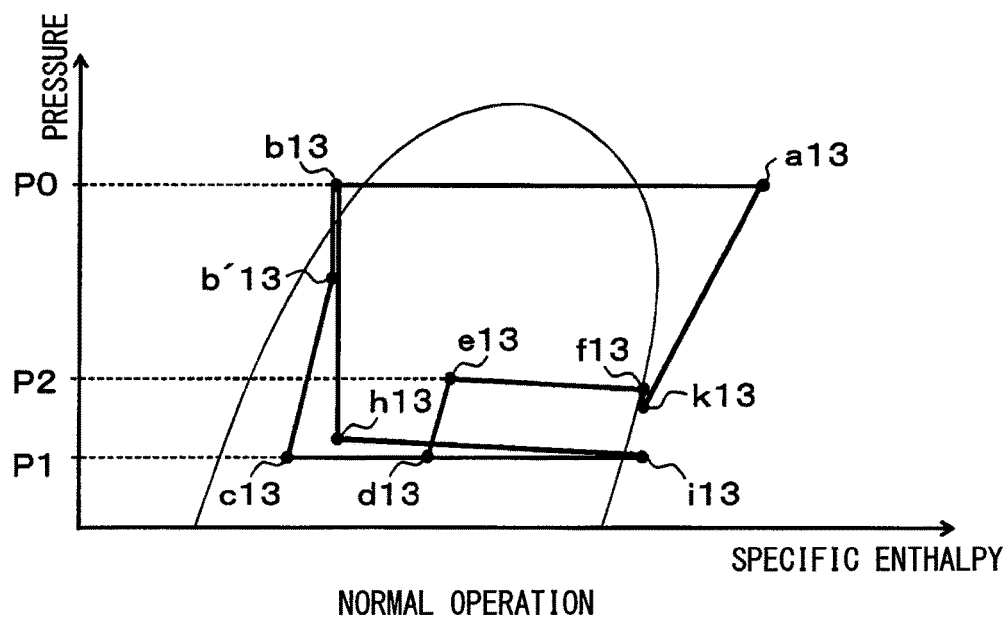
FIG. 13 is a Mollier diagram showing the states of the refrigerant during a normal operation of the ejector refrigeration cycle in the fifth embodiment.

That is, during the normal operation, the high-temperature and high-pressure refrigerant discharged from the compressor 11 (as indicated by point a13 in FIG. 13) dissipates heat therefrom in the radiator 12 until the refrigerant becomes a subcooled liquid-phase refrigerant (i.e., supercooled liquid-phase refrigerant as indicated from point a13 to point b13 in FIG. 13). Further, the flow of the refrigerant from the radiator 12 is branched by the branch portion 20.

One branch refrigerant flows into the thermal expansion valve 19 to be decompressed in isentropic (as indicated from point b13 to point b'13 in FIG. 13). At this time, a throttle opening degree of the thermal expansion valve 19 is adjusted such that the degree of superheat of the refrigerant on the outlet side of the first evaporator 14 approaches the reference degree of superheat KSH. The refrigerant flowing out of the thermal expansion valve 19 flows into the nozzle portion 15a of the ejector 15 and is then isentropically decompressed and injected therefrom (as indicated from point b'13 to point c13 in FIG. 13).

The refrigerant flowing out of the first evaporator 14 (at point i13 in FIG. 13) is drawn from the refrigerant suction port 15c into the ejector 15 by the suction effect of the injection refrigerant injected from the nozzle portion 15a. The injection refrigerant injected from the nozzle portion 15a and the suction refrigerant drawn from the refrigerant suction port 15c are merged together and pressurized in the diffuser 15d (as indicated from point c13 to point d13 and then point e13, and from point i13 to point d13 and then point e13 in FIG. 13).

The refrigerant flowing out of the diffuser 15d flows into the second evaporator 21. The refrigerant flowing into the second evaporator 21 absorbs heat from the ventilation air blown by the blower fan 21a to evaporate itself (as indicated from point e13 to point f13 in FIG. 13). In this way, the ventilation air to be blown to the rear seat of the vehicle is cooled. The refrigerant flowing out of the second evaporator 21 is drawn into and compressed again by the compressor 11 (as indicated from point k13 to point a13 as shown in FIG. 13).

The other refrigerant obtained by branching through the branch portion 20 is decompressed by the fixed throttle 17 (as indicated from point b13 to point h13 in FIG. 13), and then flows into the first evaporator 14. The refrigerant flowing into the first evaporator 14 absorbs heat from the ventilation air blown by the blower fan 14a to evaporate itself (as indicated from point h13 to point i13 in FIG. 13). In this way, the ventilation air to be blown to the front seat of the vehicle is cooled. The refrigerant flowing out of the first evaporator 14 is drawn from the refrigerant suction port 15c as described above.

As mentioned above, during the normal operation, the ejector refrigeration cycle 10b can perform cooling of the ventilation air to be blown toward the front seat of the vehicle and the ventilation air to be blown toward the rear seat of the vehicle. At this time, the refrigerant evaporation pressure in the first evaporator can be lower than that in the second evaporator by the pressurizing effect of the ejector 15. Therefore, the ventilation air to be blown toward the front seat of the vehicle equipped with a driver's seat can be cooled effectively.

Furthermore, in the ejector refrigeration cycle 10b, the suction port side of the compressor 11 is connected to the downstream side of the diffuser 15d, which can improve the coefficient of performance (COP) of the cycle, like the first embodiment.

Next, the low-load operation will be described with reference to a Mollier diagram shown in FIG. 14. During the low-load operation, like the above-mentioned embodiment, the differential pressure regulating valve 40 opens the bypass passage 18, allowing the refrigerant to flow as indicated by the dashed arrow, in addition to the solid arrow in FIG. 12.

Figure 14:
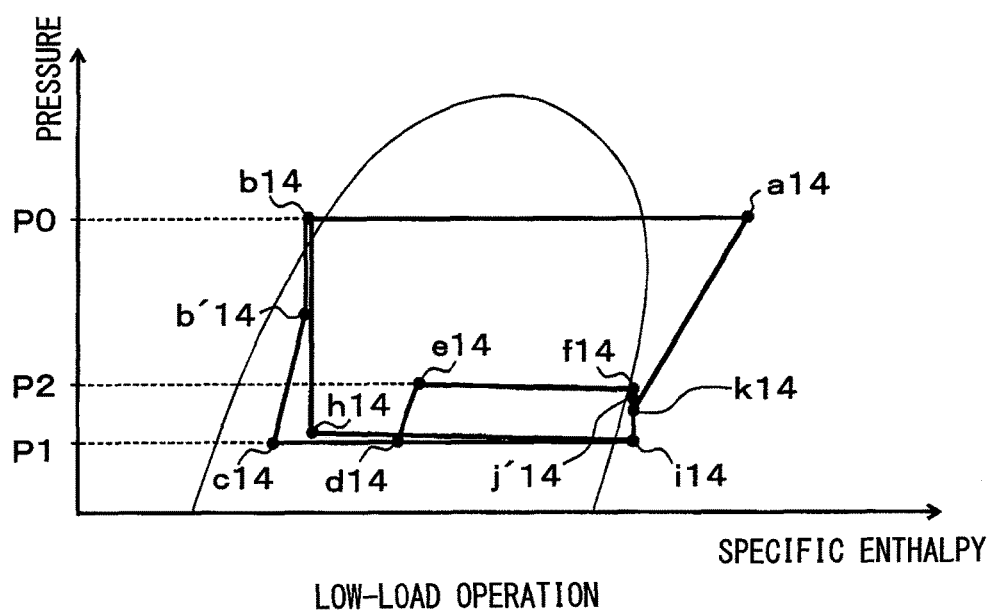
FIG. 14 is a Mollier diagram showing the states of the refrigerant during a low-load operation of the ejector refrigeration cycle in the fifth embodiment.

That is, also during the low-load operation, like the normal operation, the high-temperature and high-pressure refrigerant discharged from the compressor 11 (as indicated by point a14 in FIG. 14) dissipates heat therefrom in the radiator 12 until the refrigerant becomes a subcooled liquid-phase refrigerant (as indicated from point a14 to point b14 in FIG. 14). At this time, like the first embodiment, the pressure P0 of the refrigerant discharged from the compressor 11 in the low-load operation becomes lower than in the normal operation.

Further, the flow of the subcooled liquid-phase refrigerant from the radiator 12 is branched by the branch portion 20. Like the normal operation, one of the refrigerants obtained by the branching through the branch portion flows into the nozzle portion 15a of the ejector 15 via the thermal expansion valve 19 and is then isentropically decompressed and injected therefrom (as indicated from point b14 to point b'14 and then c14 in FIG. 14). Thus, part of the refrigerant flowing out of the first evaporator 14 (as indicated at point i14 in FIG. 14) is drawn from the refrigerant suction port 15c.

In the low-load operation, the flow rate of the driving flow is decreased, compared to the normal operation. Thus, the kinetic energy of the refrigerant, which is to be converted to the pressure energy in the diffuser 15d, is also reduced. Because of this, during the low-load operation, the pressurizing amount of the refrigerant in the diffuser 15d is reduced, whereby the pressure difference (P2−P1) becomes lower than the reference pressure difference ΔKP. Consequently, the differential pressure regulating valve 40 opens the bypass passage 18.

Thus, in the low-load operation, part of the refrigerant flowing out of the first evaporator 14 is drawn from the refrigerant suction port 15c, while the remaining refrigerant flows into the bypass passage 18.

The suction refrigerant drawn from the refrigerant suction port 15c is mixed with the injection refrigerant in the diffuser 15d, like the normal operation, and then the mixture is pressurized (as indicated from point c14 to point d14 and then point e14, and from point i14 to point d14 and then point e14 in FIG. 14). Thereafter, the refrigerant pressurized in the diffuser 15d flows in the same way as in the normal operation.

On the other hand, the refrigerant flowing into the bypass passage 18, which is part of the refrigerant flowing out of the first evaporator 14, is pressurized when passing through the expanded portion 18a (as indicated from point i14 to point j'14 in FIG. 14). The refrigerant flowing out of the bypass passage 18 is merged with the refrigerant flowing out of the second evaporator 21 and drawn into and compressed again by the compressor 11 (as indicated from point k14 to point a14 as shown in FIG. 14).

As mentioned above, in the low-load operation, the differential pressure regulating valve 40 serving as the bypass flow-rate adjustment device allows the refrigerant to circulate through the bypass passage 18, so that the compressor 11 can draw the refrigerant on the outlet side of the evaporator 14 via the bypass passage 18. Thus, during the low-load operation, the adequate amount of the refrigerant can flow into the evaporator 14 by using a refrigerant press-feeding effect and a suction effect of the compressor 11. Consequently, the ventilation air can be sufficiently cooled by the evaporator 14.

Furthermore, the differential pressure regulating valve 40 increases a bypass flow rate Gb to reduce the flow rate of the refrigerant flowing from the refrigerant suction port 15c to the diffuser 15d, thus making it possible to suppress the reduction in the pressurizing amount in the diffuser 15d (corresponding to the difference between P2 and P1 as shown in FIG. 14). In addition, the enlarged portion 39a can convert the velocity energy of the refrigerant circulating through the bypass passage 18 into the pressure energy, thereby increasing the pressure of the refrigerant.

Therefore, like the first embodiment, the reduction in the COP in the low-load operation can also be suppressed. That is, the ejector refrigeration cycle 10b in this embodiment can sufficiently cool the ventilation air, even though the flow rate of the driving flow in the ejector 15 is reduced during the low-load operation.

Other Embodiments

The present disclosure is not limited to the above-mentioned embodiments, and various modifications and changes can be made to those embodiments in the following way without departing from the spirit of the present disclosure.

(1) The components forming the ejector refrigeration cycles 10, 10a, and 10b are not limited to those disclosed in the above-mentioned embodiments.

While in each of the above-mentioned embodiments, the compressor 11 adopts, for example, an electric compressor, the compressor 11 in use may be an engine-driven compressor that is driven by a rotational driving force transferred from the vehicle traveling engine via pulley, a belt, etc. Furthermore, the engine-driven compressor in use can be a variable displacement compressor that adjusts the refrigerant discharge capacity by changing its discharge displacement, or a fixed displacement compressor that adjusts the refrigerant discharge capacity by changing its operating rate of the compressor through the connection/disconnection of an electromagnetic clutch.

In the above-mentioned embodiments, the radiator 12 employs a sub-cool type heat exchanger by way of example. Alternatively, a standard radiator configured of only the condensing portion 12a may be adopted. Further, a reservoir (receiver) may be employed along with the standard radiator. The reservoir separates the refrigerant dissipating its heat in the radiator, into gas and liquid phase refrigerants, and stores an excessive liquid-phase refrigerant.

The above-mentioned first to third embodiments employ, as the driving device 37 for displacing the passage formation member 35, the ejector 13 that includes the sealing space 37b into which the thermo-sensitive medium having its pressure changeable in accordance with the temperature change is sealed, as well as the diaphragm 37a which is displaced in accordance with the pressure of the thermo-sensitive medium in the sealing space 37b by way of example. However, the driving device is not limited thereto.

For example, the thermo-sensitive medium in use may be a thermowax that has its volume changeable depending on the temperature. The driving device in use may be one that has an elastic member made of a shape-memory alloy. Alternatively, a driving device in use may be one that uses an electric mechanism, such as an electric motor or a solenoid, to displace the passage formation member 35.

In the ejectors 15 of the above-mentioned fourth and fifth embodiments, no swirl space is formed to generate a swirling flow in the refrigerant flowing into the nozzle portion 15a. However, a swirl space formation member may be provided in the fourth and fifth embodiments to form the same swirl space as that of the ejector 13 in each of the first to third embodiments.

In the above-mentioned embodiments, the refrigerant can employ, for example, R134a or R1234yf, but the refrigerant is not limited thereto. Examples of the refrigerant in use can include R600a, R410A, R404A, R32, R1234yfxf, and R407C. Alternatively, a mixed refrigerant composed of a mixture of a plurality of kinds of refrigerants may be used.

(2) The above-mentioned fourth and fifth embodiments employ the thermal expansion valve 19 by way of example as the driving flow-rate adjustment portion. However, the driving flow-rate adjustment portion is not limited thereto. For instance, the nozzle portion 15a of the ejector 15 may be configured as a variable nozzle portion having its refrigerant passage area changeable, and the driving flow-rate adjustment portion may be configured by a needle valve that changes its refrigerant passage area of the nozzle portion 15a and an electric actuator or the like that displaces the needle valve.

(3) Although in the above-mentioned embodiments, the ejector refrigeration cycle 10 according to the present disclosure is applied to the vehicle air conditioner by way of example, the application of the ejector refrigeration cycle 10 is not limited thereto. Examples of the applications of the ejector refrigeration cycle can include a stationary air conditioner, a cool storage, and a vending machine cooling-heating device.

In the above-mentioned embodiments, the ejector refrigeration cycle 10 according to the present disclosure uses the radiator 12 as an exterior side heat exchanger for exchanging heat between the refrigerant and the outside air, and the evaporator 14 (second evaporator 20) as a user-side heat exchanger for cooling the ventilation air. Conversely, a heat pump cycle may be configured in which the evaporator 14 (second evaporator 20) is used as the exterior heat exchanger for absorbing heat from a heat source, such as the outside air, and the radiator 12 is used as an interior side heat exchanger for heating a fluid to be heated, such as air or water.

(4) The parts and devices disclosed in the above-mentioned respective embodiments may be combined together within the feasible range as appropriate. For instance, the bypass flow-rate adjustment device applied to the ejector refrigeration cycle 10a or 10b disclosed in the fourth or fifth embodiment may use the flow-rate adjustment valve 41 or 42 described in the second or third embodiment, in place of the differential pressure regulating valve 40.

What is claimed is:
1. An ejector to be used in a vapor compression refrigeration cycle device, the ejector comprising:
  a body that includes a decompression space adapted to decompress a refrigerant flowing in from an outside of the body, a suction passage communicating with a downstream side of a refrigerant flow of the decompression space and adapted to circulate a refrigerant drawn from the outside of the body, and a pressurizing space that mixes injection refrigerant injected from the decompression space with suction refrigerant drawn from the suction passage; and
  a passage formation member, at least a part of which is disposed within the decompression space and the pressurizing space, the passage formation member being formed in a conical shape having a sectional area which is enlarged as it extends farther away from the decompression space, wherein
  a refrigerant passage is defined between an inner peripheral surface of a part forming the decompression space and an outer peripheral surface of the passage formation member in the body, wherein the refrigerant passage is a nozzle passage serving as a nozzle that decompresses and injects the refrigerant flowing out of a swirl space,
  a refrigerant passage is defined between an inner peripheral surface of a part forming the pressurizing space and an outer peripheral surface of the passage formation member in the body, wherein the refrigerant passage is a diffuser passage serving as a pressurizing portion that mixes the injection refrigerant with the suction refrigerant and pressurizes the mixed refrigerant, the body includes a bypass passage that guides the refrigerant on a side of the suction passage to a downstream side of the diffuser passage while bypassing the diffuser passage, and the bypass passage includes an enlarged portion that has a passage sectional area in enlarged in a refrigerant flow direction in the bypass passage, and the bypass passage further includes a bypass flow-rate adjustment valve that adjusts a bypass flow rate of the refrigerant circulating through the bypass passage.

2. The ejector according to claim 1, wherein
the bypass flow-rate adjustment valve increases the bypass flow rate in accordance with a decrease of a difference in pressure that is obtained by subtracting a pressure of the refrigerant on an inlet side of the bypass passage from a pressure of the refrigerant on an outlet side of the bypass passage.

3. The ejector according to claim 1, wherein
the bypass flow-rate adjustment valve increases the bypass flow rate in accordance with an increasing degree of superheat of the refrigerant on an outlet side of the evaporator.

4. The ejector according to claim 1, further comprising a driving device that changes refrigerant passage areas of the nozzle passage and the diffuser passage by displacing the passage formation member.

5. The ejector according to claim 4, wherein the driving device displaces the passage formation member based on a temperature and a pressure of the refrigerant circulating through a refrigerant passage that leads from an inlet side of the suction passage to an inlet side of the bypass passage such that a superheat degree of the refrigerant flowing into the suction passage approaches a predetermined reference degree of superheat.

6. The ejector according to claim 1, wherein the body includes the swirl space, and the swirl space swirls the refrigerant flowing in from an outside to flow out the swirling refrigerant toward the decompression space.

7. The ejector according to claim 6, wherein the refrigerant flowing into the swirl space is a liquid-phase refrigerant.

8. The ejector according to claim 1, wherein the body includes a gas-liquid separation space that separates the refrigerant flowing out of the pressurizing space into gas and liquid phase refrigerants.

* * * * *